US012682407B2

(12) United States Patent
Mori et al.

(10) Patent No.: US 12,682,407 B2
(45) Date of Patent: Jul. 14, 2026

(54) FOOD DEVELOPMENT ASSISTANCE APPARATUS, FOOD DEVELOPMENT ASSISTANCE METHOD, AND RECORDING MEDIUM

(71) Applicant: NEC Corporation, Tokyo (JP)

(72) Inventors: Yoji Mori, Tokyo (JP); Ayako Hoshino, Tokyo (JP); Yuya Endo, Tokyo (JP); Yuuki Watanabe, Tokyo (JP); Naruto Yajima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 349 days.

(21) Appl. No.: 18/682,527

(22) PCT Filed: Sep. 15, 2021

(86) PCT No.: PCT/JP2021/033834

§ 371 (c)(1),
(2) Date: Feb. 9, 2024

(87) PCT Pub. No.: WO2023/042286

PCT Pub. Date: Mar. 23, 2023

(65) Prior Publication Data

US 2024/0362726 A1 Oct. 31, 2024

(51) Int. Cl.
*G06Q 50/04* (2012.01)

(52) U.S. Cl.
CPC .................................... *G06Q 50/04* (2013.01)

(58) Field of Classification Search
CPC ................................ G06Q 50/04; Y02P 90/30
See application file for complete search history.

(56) References Cited

U.S. PATENT DOCUMENTS

2002/0152111 A1* 10/2002 Cox ................. G06Q 10/06375 705/7.31
2003/0167201 A1 9/2003 Yamano
(Continued)

FOREIGN PATENT DOCUMENTS

JP WO2002/027577 A1 2/2004
JP 2008-104469 A 5/2008
(Continued)

OTHER PUBLICATIONS

International Search Report for PCT Application No. PCT/JP2021/033834, mailed on Nov. 22, 2021.
(Continued)

*Primary Examiner* — Ziaul Karim

(57) ABSTRACT

In order to suitably assist the development of a new food product, a food development assistance apparatus (1) includes: an accepting means (11) for accepting a request regarding development of a new food product; an inferring means (12) for inferring, based on the request and a learned model which has learned a relation between a method for producing an existing product which is an existing food product and at least one selected from the group consisting of an ingredient used in the existing product, a commodity category of the existing product, a development concept of the existing product, and a property of the existing product, a method for producing a new product which matches the request; and an outputting means (13) for outputting information which indicates the method for producing the new product inferred by the inferring means.

20 Claims, 16 Drawing Sheets

(56) References Cited

U.S. PATENT DOCUMENTS

| | | | | |
|---|---|---|---|---|
| 2008/0213458 A1* | 9/2008 | Anderson | A23L 19/09 | 426/648 |
| 2012/0201948 A1* | 8/2012 | Huber | A23L 19/15 | 426/523 |
| 2014/0372357 A1* | 12/2014 | Smith-Simpson | G01N 33/02 | 706/46 |
| 2019/0205964 A1 | 7/2019 | Onoro et al. | | |

FOREIGN PATENT DOCUMENTS

| | | |
|---|---|---|
| JP | 2016-139225 A | 8/2016 |
| JP | 2019-061366 A | 4/2019 |
| JP | 2019-125364 A | 7/2019 |
| WO | 2021/166673 A1 | 8/2021 |

OTHER PUBLICATIONS

"Presenting Ingredients Based on Target Flavors—Kirin's Beer-Developing AI", Nikkei MJ (Nikkei Ryutsu Shimbun), p. 5, Aug. 27, 2021.

* cited by examiner

| | CANDIDATE ID | ADDITIONAL INGREDIENT | COOKING PROCEDURE | POSSIBILITY OF ALLERGY | RECOMMENDATION LEVEL |
|---|---|---|---|---|---|
| CATEGORY 1 | A | INGREDIENTS a1, a2, a3, ··· | BOILING | NONE | 5 |
| | B | INGREDIENTS b1, b2, ··· | FRYING | b2 ALLERGY | 0 |
| | ··· | ··· | ··· | ··· | ··· |
| CATEGORY 2 | C | INGREDIENTS c1, c2, c3, ··· | STEAMING | NONE | 0 |
| | D | INGREDIENTS d1, ··· | BROILING | NONE | 10 |
| | ··· | ··· | ··· | ··· | ··· |
| ··· | ··· | ··· | ··· | ··· | ··· |

FOOD DEVELOPMENT ASSISTANCE APPARATUS, FOOD DEVELOPMENT ASSISTANCE METHOD, AND RECORDING MEDIUM

This application is a National Stage Entry of PCT/JP2021/033834 filed on Sep. 15, 2021, the contents of all of which are incorporated herein by reference, in their entirety.

TECHNICAL FIELD

The present invention relates to a food development assistance apparatus, etc. for generating information regarding the development of food.

BACKGROUND ART

In the development of a new food product, a process is carried out, the process being selecting a combination promising for the achievement of a product concept, from among a huge number of combinations of material and production method to prototype a product, and verifying the taste, appearance, eating texture, flavor, etc. of the product. (See, for example, Patent Literature 1 below.)

CITATION LIST

Patent Literature

[Patent Literature 1]
Japanese Patent Application Publication, Tokukai, No. 2008-104469

SUMMARY OF INVENTION

Technical Problem

With the development of a new food product, there is a problem of entailing a large amount of effort and a large amount of time because it is necessary to repeat the above process until a combination by which the product concept is achieved is found. Thus, there is the demand for a technique to assist the development of a new food product. This applies to the development of a new cooking recipe.

As example aspect of the present invention has been made in view of the above problem, and an example object thereof is to provide a technique to suitably assist the development of a new food product.

Solution to Problem

A food development assistance apparatus in accordance with an example aspect of the present invention includes at least one processor, and the at least one processor carries out: an accepting process of accepting a request regarding development of a new food product; an inferring process of inferring, based on the request and a learned model which has learned a relation between a method for producing an existing product which is an existing food product and at least one selected from the group consisting of an ingredient used in the existing product, a commodity category of the existing product, a development concept of the existing product, and a property of the existing product, a method for producing a new product which matches the request; and an outputting process of outputting information which indicates the method for producing the new product inferred in the inferring process.

A food development assistance method in accordance with an example aspect of the present invention includes: a computer accepting a request regarding development of a new food product; the computer inferring, based on the request and a learned model which has learned a relation between a method for producing an existing product which is an existing food product and at least one selected from the group consisting of an ingredient used in the existing product, a commodity category of the existing product, a development concept of the existing product, and a property of the existing product, a method for producing a new product which matches the request; and the computer outputting information which indicates the method for producing the new product inferred.

A recording medium in accordance with an example aspect of the present invention is a computer-readable non-transitory recording medium having recorded thereon a food development assistance program which causes a computer to carry out: a process of accepting a request regarding development of a new food product; a process of inferring, based on the request and a learned model which has learned a relation between a method for producing an existing product which is an existing food product and at least one selected from the group consisting of an ingredient used in the existing product, a commodity category of the existing product, a development concept of the existing product, and a property of the existing product, a method for producing a new product which matches the request; and a process of outputting information which indicates the method for producing the new product inferred.

Advantageous Effects of Invention

With an example aspect of the present invention, it is possible to suitably assist the development of a new food product.

EXAMPLE EMBODIMENTS

First Example Embodiment

The following description will discuss a first example embodiment of the present invention in detail, with reference to the drawings. The present example embodiment is basic to example embodiments which will be described later.

(Food Development Assistance Apparatus)

Figure 1:
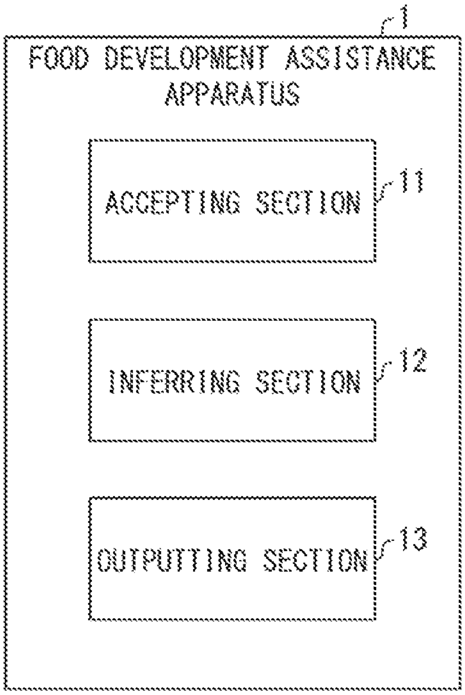
FIG. 1 is a block diagram illustrating a configuration of a food development assistance apparatus in accordance with a first example embodiment of the present invention.

A configuration of a food development assistance apparatus 1 in accordance with the present example embodiment will be described below with reference to the drawings. FIG. 1 is a block diagram illustrating a configuration of the food development assistance apparatus 1 in accordance with the present example embodiment.

The food development assistance apparatus 1 includes an accepting section (accepting means) 11, an inferring section (inferring means) 12, and an outputting section (outputting means) 13, as illustrated in FIG. 1.

The accepting section 11 accepts a request regarding the development of a new food product. The inferring section 12 infers, based on the request and a learned model which has learned a relation between the method for producing an existing product which is an existing food product and at least one selected from the group consisting of an ingredient used in the existing product, the commodity category of the existing product, the development concept of the existing product, and a property of the existing product, a method for producing a new product which matches the request accepted by the accepting section 11. The outputting section 13 outputs information which indicates the production method inferred by the inferring section 12.

The above "production method" can include, for example, the type of ingredient, the type of flavoring, the order in which the ingredient and the flavoring are inputted, the formulation of the ingredient and the flavoring, a cooking procedure (such as steaming, boiling, broiling, or frying), the order in which cooking procedures are performed, cooking temperature, cooking time (such as mixing time), cooking speed (such as mixing speed), cooking tool and equipment, and a sterilization method. Further, the above "production method" includes at least one selected from the group consisting of a production process and a recipe.

With the food development assistance apparatus 1 having the above configuration, it is possible to present, to a user, a method for producing a new product that can be said to match a request, on the basis of the relation between the method for producing an existing product and at least one selected from the group consisting of an ingredient used in the existing product, the commodity category of the existing product, the development concept of the existing product, and a property of the existing product. Therefore, the above configuration provides an example advantage of making it possible to suitably assist the development of a new food product.

(Food Development Assistance Program)

The functions of the food development assistance apparatus 1 can be implemented by a program. The food development assistance program in accordance with the present example embodiment causes a computer to carry out: a process of accepting a request regarding the development of a new food product; a process of inferring, based on the request and a learned model which has learned a relation between a method for producing an existing product which is an existing food product and at least one selected from the group consisting of an ingredient used in the existing product, the commodity category of the existing product, the development concept of the existing product, and a property of the existing product, a method for producing a new product which matches the request; and a process of outputting information which indicates the method for producing the new product inferred by the inferring means. This food development assistance program provides an example advantage of making it possible to suitably assist the development of a new food product.

(Food Development Assistance Method)

Figure 2:
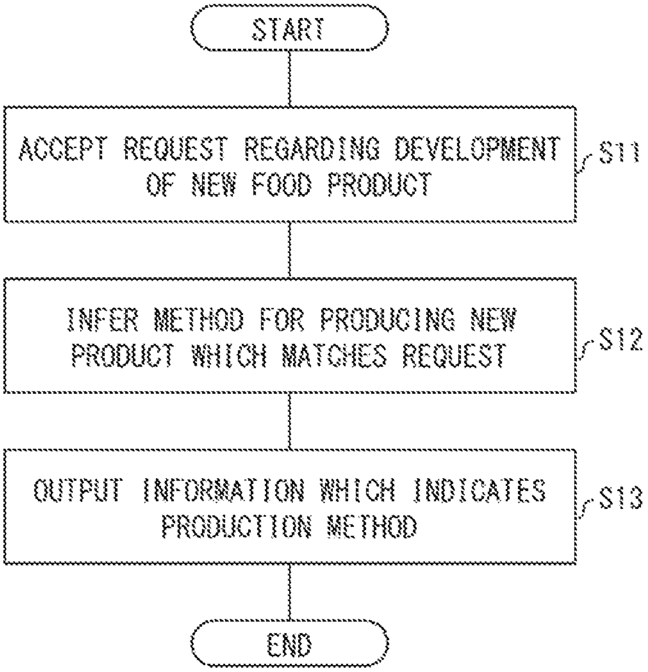
FIG. 2 is a flowchart illustrating a configuration of a food development assistance method in accordance with the first example embodiment of the present invention.

A food development assistance method in accordance with the present example embodiment will be described below with reference to FIG. 2. FIG. 2 is a flowchart illustrating a flow of a food development assistance method in accordance with the first example embodiment of the present invention.

In S11, a computer accepts a request regarding the development of a new food product. The request may be accepted via any input equipment. For example, the request may be accepted via a mouse, a keyboard, a touch panel, or voice-input equipment.

In S12, the computer infers, based on the request and a learned model which has learned a relation between the method for producing an existing product which is an existing food product, and at least one selected from the group consisting of an ingredient used in the existing product, the commodity category of the existing product, the development concept of the existing product, and a property of the existing product, a method for producing the new product which matches the request accepted in S11.

In S13, the computer outputs information which indicates the inferred method for producing the new product. The information is outputted to any equipment. For example, the information may be outputted to a display so as to be outputted on a display basis, or may be outputted to voice-output equipment so as to be outputted on a voice basis.

As above, according to the food development assistance method in accordance with the present example embodiment, a computer accepts a request regarding the development of a new food product (S11), the computer infers, based on the request and a learned model which has learned a relation between the method for producing an existing product which is an existing food product and at least one selected from the group consisting of an ingredient used in the existing product, the commodity category of the existing product, the development concept of the existing product, and a property of the existing product, a method for producing a new product which matches the request (S12), and the computer outputs information which indicates the method for producing the new product inferred in S12 (S13). This food development assistance method provides an example advantage of making it possible to suitably assist the development of a new food product.

The steps of the food development assistance method may be carried out by a single computer (e.g., food development assistance apparatus 1), or may be carried out by respective computers. This applies to the flows described in the second and the subsequent example embodiments.

[Graph and Learning]

Here is a description of a graph which is an example of information which can be used to assist food development in the first example embodiment and example embodiments which will be described later (hereinafter, each example embodiment). In addition, the training of the graph and a prediction made with use of the graph will be described as well.

(Graph)

The graph herein refers to data having a structure which includes a plurality of nodes and links connecting the nodes. The type of link which represents a relation between nodes is referred to as a "relation". Further, a link can be referred to as an edge. The graph roughly includes a directed graph in which each link has directionality, and an undirected graph in which each link has no directionality. It is possible to use either the directed graph or the undirected graph. It is also possible to use those graphs in combination.

In a case where the graph is used in each example embodiment, the nodes may represent tangible or intangible elements regarding food production method. For example, the graph containing nodes representing various elements such as:

- ingredient;
- flavoring;
- commodity category;
- development concept;
- property (such as eating texture, flavor, appearance, or allergy)
- identification information regarding a product such as a product name or a product ID
- production method can be used. It should be noted that more precisely, the property indicates a characteristic or a state, and the category of the property also includes, for example, an eating texture, a flavor, appearance, the presence or absence of an allergy, the details of an allergy, a surface texture, which state the food of interest is in, a liquid state or a solid state, and into what country or region on the earth the style of the food of interest can fall (e.g., Japanese style, Western style, or Chinese style).

The graph may contain a plurality of nodes which correspond to a single element. For example, as a node indicating the component of an ingredient, each of the ingredients of food may be represented by an individual node, such as a node indicating a first ingredient, a node indicating a second ingredient, or a node indicating a third ingredient. The same applies to the other elements.

In a case where there is the above-described nodes as an element, a relation represented by a link represents

- a relation between a certain element and an ingredient,
- a relation between a certain element and a flavoring,
- a relation between a certain element and a commodity category,
- a relation between a certain element and a development concept,
- a relation between a certain element and a property,
- a relation between a certain element and a product, or the like. For example, a link connecting a node indicating an ingredient and a node indicating a property may represent a relation in which the ingredient is a factor in the property.

(Learning and Prediction)

A machine learning technique can be used to perform graph-based relationship learning on the graph as described above. Performing such learning makes it possible to use the graph to carry out processes such as a classifying process and a predicting process. Note that in each example embodiment, such learning may be performed as a part of food production assistance, or a learned graph which already has undergone such learning may be used.

In graph-based relationship learning, the feature quantity of each node is calculated first. The feature quantity may be calculated in the form of, for example, a feature quantity vector. By representing the feature quantity of each node via a feature quantity vector, it is possible to also train a graph containing nodes of different forms in a mixed manner. For example, it is possible to also subject, to graph-based relationship learning, a graph containing images, numerical values, etc. which indicate various elements as described above.

Figure 3:
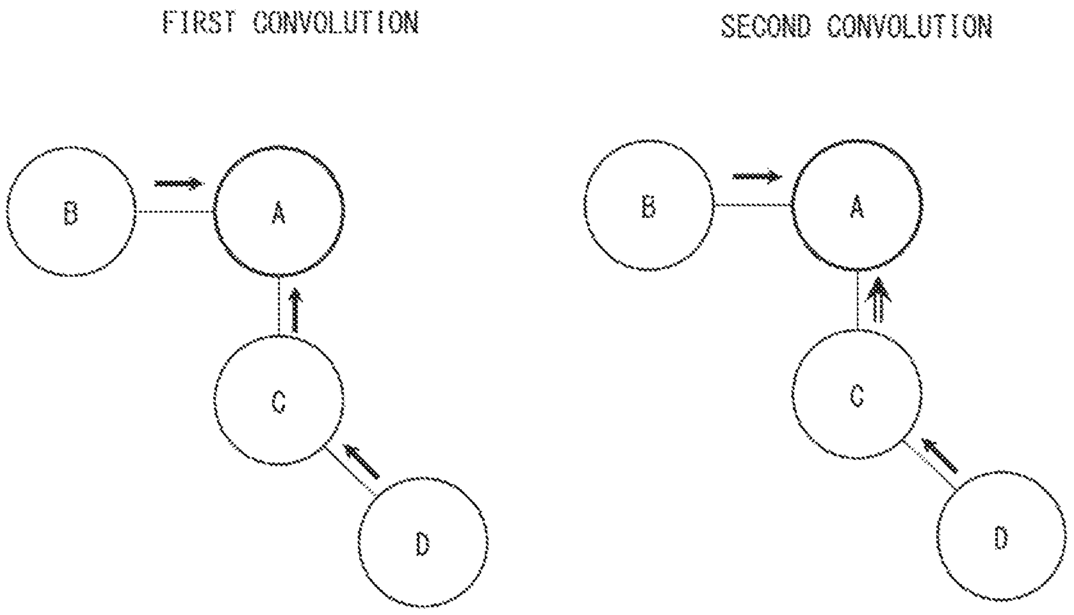
FIG. 3 is an explanatory diagram of learning of a feature quantity in graph-based relationship learning.

Next, the feature quantity of each node is updated on the basis of a link connected to that node and a node to which the link is connected. This process is similar to a convolution process in a convolutional neural network. This will be described below with reference to FIG. 3. FIG. 3 is an explanatory diagram illustrating learning of a feature quantity in graph-based relationship learning.

The graphs illustrated in FIG. 3 each contain four nodes A to D. The nodes B and C are connected to the node A, and the node D is connected to the node C. After calculating initial feature quantities of these four nodes, convolution is performed a plurality of times as described below to update the feature quantities of the respective nodes.

In the first convolution, the feature quantities of the nodes B and C connected to the node A are each multiplied by a predetermined weight and are then added to the initial feature quantity of the node A. For the node C, the feature quantity of the node D is multiplied by a predetermined weight and is then added to the initial feature quantity of the node C. Note that, in a case of a directed graph, the weight is adjusted according to the direction of the link.

Also in the second convolution, similarly to the first convolution, for each of the nodes, the feature quantity of a node linked to that node is multiplied by a predetermined weight, and is then added to the feature quantity of that node.

In this respect, the feature quantity of the node D is reflected in the feature quantity of the node C by the first convolution. Therefore, by the second convolution, not only the feature quantity of the node C but also the feature quantity of the node D is reflected in the feature quantity of the node A.

By repeating the above-described process a number of times according to the hierarchy of nodes, the feature quantities of nodes which are directly or indirectly connected to each other via links are mutually reflected. In graph-based relationship learning, a weight value used for the above-described weighting is optimized on the basis of a known relationship between nodes. By using a learned graph, it is possible to make predictions such as an inter-node relation prediction and a link destination node prediction which are described below.

(Inter-Node Relation Prediction)

By performing the learning described above, it is possible to predict an inter-node relation which is not explicitly indicated in an original graph. In a case of making an inter-node relation prediction, a user may designate two nodes and make a request for returning a relation between those nodes. For example, in a case where a request inquiring about a relation between a node “product A” and a node “tomato” is inputted from a user, it is possible to predict, by inter-node relation prediction, that a relation (i.e., a link) that connects these nodes is “ingredient”. In the inter-node relation prediction, it is possible to calculate a probability (likelihood) of a prediction result. The same applies to a node prediction described below.

(Node Prediction)

By performing the above-described learning, it is also possible to predict a node to be connected to a certain node via a predetermined link. In a case of making a node prediction, a user may designate one node and a link the starting point of which is the one node, and make a request for returning a node to which the link is connected. Assume, for example, that a request inquiring about a node to be connected to the node “product A” via the link “ingredient” is inputted from a user. In this case, it is possible to predict, for example, whether a node to be connected to the node “product A” via the link “ingredient” is “tomato” or “eggplant”.

Second Example Embodiment (Configuration of Apparatus)

Figure 4:
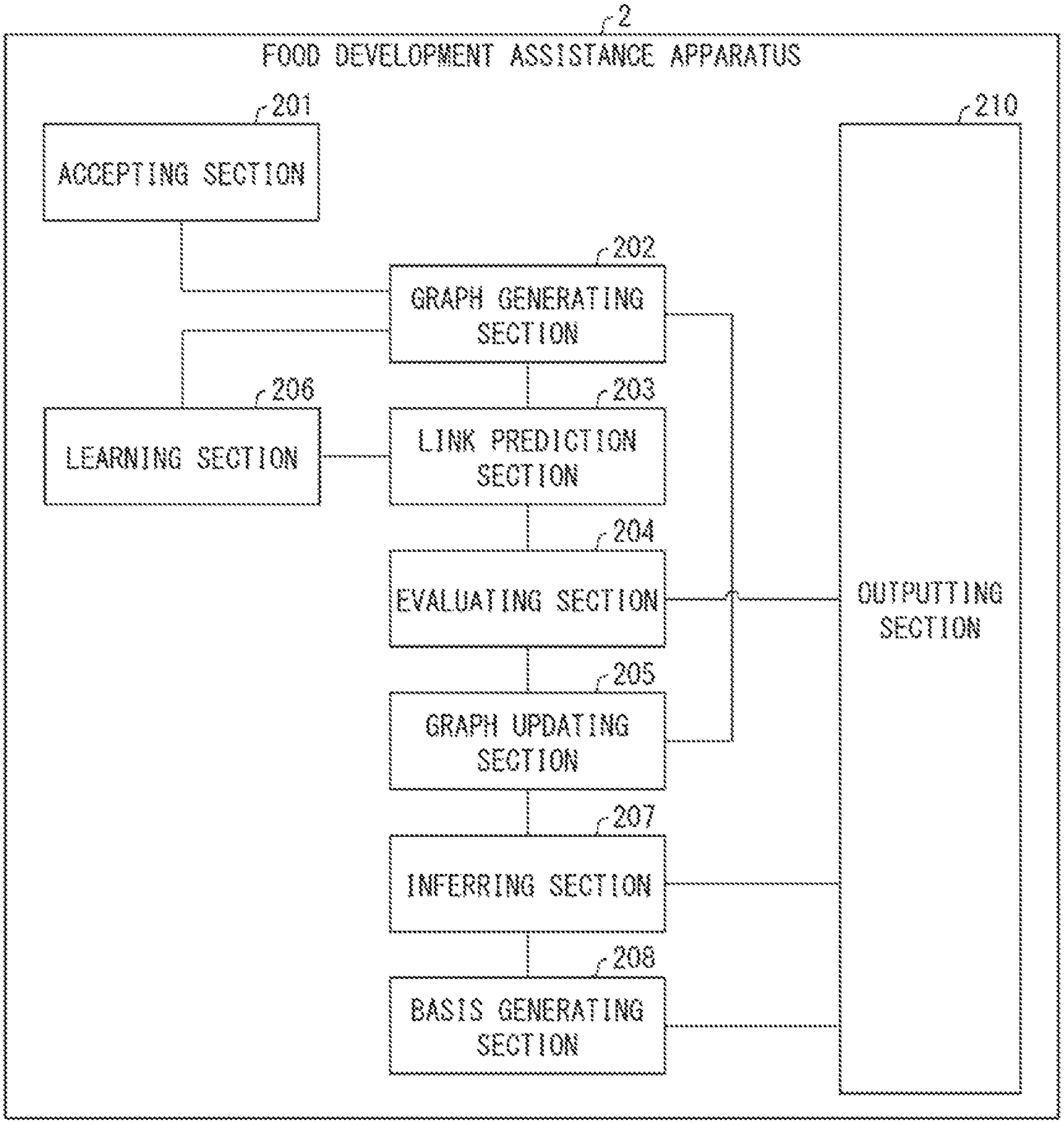
FIG. 4 is a block diagram illustrating a configuration of a food development assistance apparatus in accordance with a second example embodiment of the present invention.

The following description will discuss a configuration of a food development assistance apparatus 2 in accordance with a second example embodiment of the present invention, with reference to FIG. 4. FIG. 4 is a block diagram illustrating a configuration of the food development assistance apparatus 2 in accordance with the present example embodiment.

The food development assistance apparatus 2 includes an accepting section 201, a graph generating section 202, a link prediction section 203, an evaluating section 204, a graph updating section 205, a learning section 206, an inferring section 207, a basis generating section 208, and an outputting section 210, as illustrated.

In addition to these components, the food development assistance apparatus 2 may include, for example, input equipment via which to accept an input operation of a user, output equipment via which the food development assistance apparatus 2 outputs data, and communication equipment via which the food development assistance apparatus 2 communicates with another apparatus. The output from the output equipment may be in any manner, and may be outputted, for example, on a display basis or on a voice basis.

The accepting section 201 accepts a request regarding the development of a new food product. The request contains information on a new product which a user intends to produce. As an example, the request contains, but not limited to, at least one selected from the group consisting of a commodity category, an ingredient, a flavoring, a development concept, a property, etc. that a new product is required to have.

It should be noted that as in the first example embodiment, the property indicates a characteristic or a state, and the category of the property also includes, for example, an eating texture, a flavor, appearance, the presence or absence of an allergy, the details of an allergy, a surface texture, and which state the food of interest is in, a liquid state or a solid state.

The graph generating section 202 refers to the request accepted by the accepting section 201, and generates a new product graph in which a new product is represented as a graph, on the basis of information regarding the new product which a user intends to produce, the information being indicated by the request. More specifically, the graph generating section 202 generates the new product graph in which the new product which the user intends to produce is represented with use of nodes and edges, the nodes each representing the commodity category, the development concept, a property, an ingredient, or a production method of the new product, the edges each representing relationship between corresponding ones of the nodes.

As in the first example embodiment, the above “production method” can include, as an example, the type of ingredient, the type of flavoring, the order in which the ingredient and the flavoring are inputted, the formulation of the ingredient and the flavoring, a cooking procedure (such as steaming, boiling, broiling, or frying), the order in which cooking procedures are performed, cooking temperature, cooking time (such as mixing time), cooking speed (such as mixing speed), cooking tool and equipment, and a sterilization method. Further, the above “production method” includes at least one selected from the group consisting of a production process and a recipe.

The link prediction section 203 uses the new product graph and the existing product graph, to carry out a link prediction for predicting relationship between nodes which are not connected together via a link in the new product graph and the existing product graph. The link prediction section 203 carries out the link prediction, to predict a node to be linked to a node contained in the new product graph, from among, as an example, nodes which are contained in the existing product graph and each of which indicates an ingredient, a flavoring, or a production method used in the existing product.

The existing product graph is a graph in which one or more existing products are represented with use of nodes and edges, the nodes each representing the development concept of the corresponding existing product, a property of the corresponding existing product, a production method of the corresponding existing product, or an ingredient used in the corresponding existing product, the edges each representing relationship between corresponding ones of the nodes.

The existing product graph is a graph in which one or more existing products are represented with use of nodes and edges, the nodes each representing an ingredient, a flavoring, a property, or a production method of the corresponding existing product, the edges each representing relationship between corresponding ones of the nodes. The existing product graph is a graph having learned relationship between nodes, and is a learned model. The existing product graph can also be referred to as a knowledge graph. It should be noted that a graph corresponding to a single existing product may be referred to as the existing product graph, or a graph corresponding to a plurality of existing products may be referred to as the existing product graph.

With the above configuration, a node to be linked to a node contained in a new product graph is predicted from among nodes each indicating an ingredient, a flavoring, or a production method used in an existing product. A node to be linked to a node contained in a new product graph is information useful for inferring a method for producing the new product which matches a request. With the above configuration, it is possible to identify information useful for inferring a method for producing a new product which matches a request.

The link prediction section 203 may carry out a link prediction in which the development concept of the new product is respected. As an example, the link prediction section 203 refers to the request accepted by the accepting section 201, to identify the development concept of the new product which is indicated by the request. The link prediction section 203 then predicts, from among the nodes contained in the existing product graph which contains a node which matches the identified concept, a node which indicates an ingredient, a flavoring, or a production method used in the existing product and which is to be linked to a node contained in the new product graph.

With the above configuration, a prediction range of the node to be linked to a node contained in the new product graph is narrowed to the existing product graph which contains the node which matches the development concept of the new product. This makes it possible to predict a node which is highly likely to contribute to the development concept of the new product.

The evaluating section 204 evaluates a node predicted by the link prediction section 203. As an example, the evaluating section 204 refers to the request accepted by the accepting section 201, to identify a property which is indicated by the request and which the new product is required to have. The evaluating section 204 then judges whether a node indicating the property which the new product is required to have is contained in the existing product graph which contains the node predicted by the link prediction section 203. The evaluating section 204 then more highly evaluates the node predicted by the link prediction section 203 in a case where the node indicating a property which the new product is required to have is contained in the existing product graph containing a node predicted by the link prediction section 203 than in a case where the node indicating the property is not contained in the existing product graph containing the node predicted by the link prediction section 203.

A second node contained in an existing product graph which contains a first node indicating a certain property is likely to be a factor in imparting that property to the existing product. For example, in a case where an existing product graph which contains a node indicating "having gained popularity among young people" contains a node "tapioca" indicating an ingredient of the existing product, the node "tapioca" is likely to be a factor in "gaining popularity among young people".

Therefore, according to the above configuration, among the nodes predicted by the link prediction section 203, a node of an existing product graph that contains a node indicating a property the new product is required to have is more highly evaluated than a node of an existing product graph that does not contain the node indicating the property the new product is required to have. In accordance with this evaluation, a user may determine whether to apply, to the new product, an ingredient, a flavoring, or a production method indicated by the predicted node. This makes it possible to contribute to the development of a new product having a desired property. Specific examples of an evaluation performed by the evaluating section 204 will be described later.

The graph updating section 205 updates the new product graph generated by the graph generating section 202. As an example, the graph updating section 205 refers to a result of the prediction made by the link prediction section 203 and a result of the evaluation made by the evaluating section 204, to update the new product graph. Specific examples of the updating process carried out by the graph updating section 205 will be described later.

The learning section 206 learns each inter-node relationship among the nodes contained in the existing product graph on the basis of various kinds of information on the existing product, to generate a learned existing product graph. Unless otherwise specified, the existing product graph refers to a learned graph generated through learning carried out by the learning section 206. Alternatively, a learned existing product graph may be loaded into the food development assistance apparatus 2. In this case, the learning section 206 may be omitted.

The inferring section 207 is configured to infer, based on a learned model and the request accepted by the accepting section 201, a method for producing a new product which matches the request. This learned model is a learned model which has learned a relation between (i) at least one selected from the group consisting of an ingredient used in an existing product which is an existing food product, the commodity category of the existing product, the development concept of the existing product, and a property of the existing product and (ii) the method for producing the existing product.

According to the present example embodiment, described as an example is an example in which the learned model is a graph in which one or more existing products are represented with use of nodes and edges, the nodes each representing a development concept of a corresponding existing product of the existing products, a property of the corresponding existing product, a production method of the corresponding existing product, or an ingredient used in the corresponding existing product, the edges each representing relationship between corresponding ones of the nodes, i.e., the learned model is the above-described existing product model.

With the above configuration, it is possible to infer a proper production method in consideration of mutual relationship among the development concept of the existing product, the property of the existing product, the method for producing the existing product or the ingredients used in the one or more existing products.

The inferring section 207 may infer, based on a node predicted by the link prediction section 203 through the above process, a method for producing a new product which matches the request accepted by the accepting section 201.

The basis generating section 208 generates basis information indicating the basis for the inference carried out by the inferring section 207. As a method for generating the basis information, various methods can be used. The method for generating the basis information will be described later.

The outputting section 210 outputs various kinds of information generated by the food development assistance apparatus 2, such as information indicating the production method inferred by the inferring section 207, as described above. The information is outputted to any destination. For example, in a case where the food development assistance apparatus 2 includes output equipment as described above, the information may be outputted to the output equipment. As another example, the information may be outputted to output equipment external to the food development assistance apparatus 2.

(Outline of Food Development Assistance Method)

Figure 5:
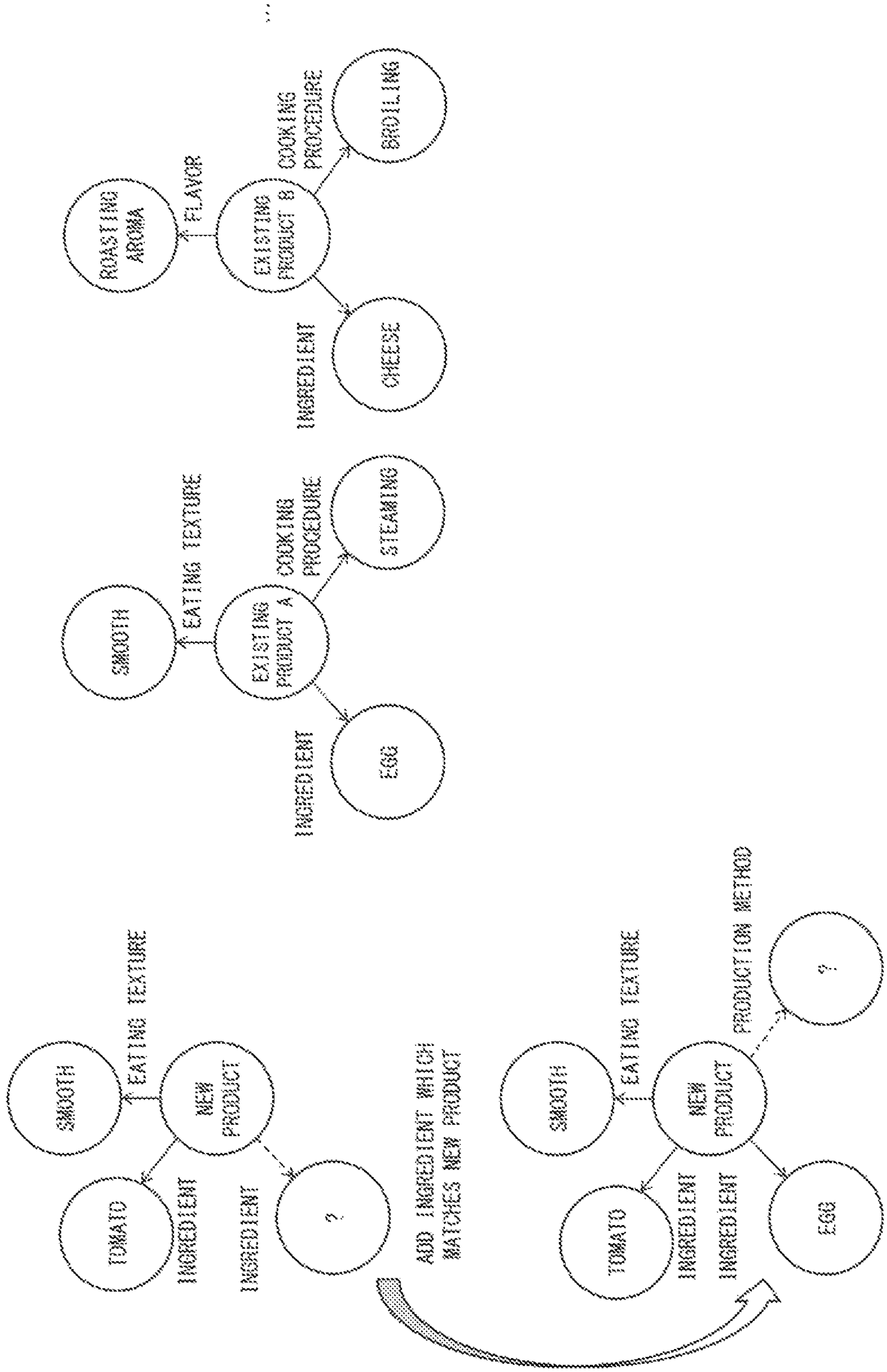
FIG. 5 is a schematic view illustrating an example of a new product graph generation method carried out by a graph generating section in accordance with the second example embodiment of the present invention.

FIG. 5 is a diagram illustrating the outline of a food development assistance method in accordance with the present example embodiment. According to the present example embodiment, a method for producing a new product which matches a request is inferred by, as an example, sequentially adding, to the new product graph, nodes indicating an ingredient, a production method, etc.

According to the present example embodiment, a link prediction is carried out with use of the new product graph and the existing product graph. The new product graph indicated in the upper left part of FIG. 5 is an example of the new product graph generated by the graph generating section 202 on the basis of the request accepted by the accepting section 201. The new product graph contains nodes and links which indicate that “tomato” is contained as an ingredient of the new product, and the new product is required to have a “smooth” eating texture.

The existing product graph indicated in the upper center part of FIG. 5 contains nodes and links which indicate that an existing product A has a “smooth” eating texture, the ingredients of the existing product A include an “egg”, and the cooking procedure in the method for producing the existing product A is “steaming”. Similarly, the existing product graph indicated in the upper right part of FIG. 5 contains nodes and links which indicate that an existing product B has a flavor of “roasting aroma”, the ingredients of the existing product B include “cheese”, and the cooking procedure in the method for producing the existing product B is “broiling”.

By training the existing product graph of each of the various existing products as described above, it is possible to make link predictions of an ingredient and a production method, and a product to which the ingredient and the production method can be applied. That is, in the food development assistance method in accordance with the present example embodiment, an ingredient and a production method that can be applied to a new product are predicted through a link prediction, and by adding nodes to a new product graph on the basis of the result of the prediction, a method for producing the new product is inferred.

For example, in the example of FIG. 5, the link prediction section 203 makes a link prediction of a node to be connected via the link “ingredient” to a node “new product” of the new product graph illustrated in the upper left part. Subsequently, on the basis of the prediction, made through this link prediction, that the node connected via the link “ingredient” to the node “new product” is “egg”, the graph generating section 202 adds a node “egg” to the new product graph, as illustrated in the lower left part of FIG. 5.

After thus determining an ingredient of the new product graph, the link prediction section 203 makes a link prediction of a node to be connected via a link “production method” to the node “new product”, in the new product graph having undergone the node addition. This makes it possible to predict a production method in consideration of a node which has been added on the basis of the result of a link prediction and which indicates a component.

With the food development assistance method in accordance with the present example embodiment, by repeating the process described above, it is possible to sequentially predict ingredients and a cooking procedure for imparting a smooth eating texture to a new product, and recommend a production method which includes the predicted ingredients and cooking procedure.

(Prediction Method Carried Out by Link Prediction Section)

Figure 6:
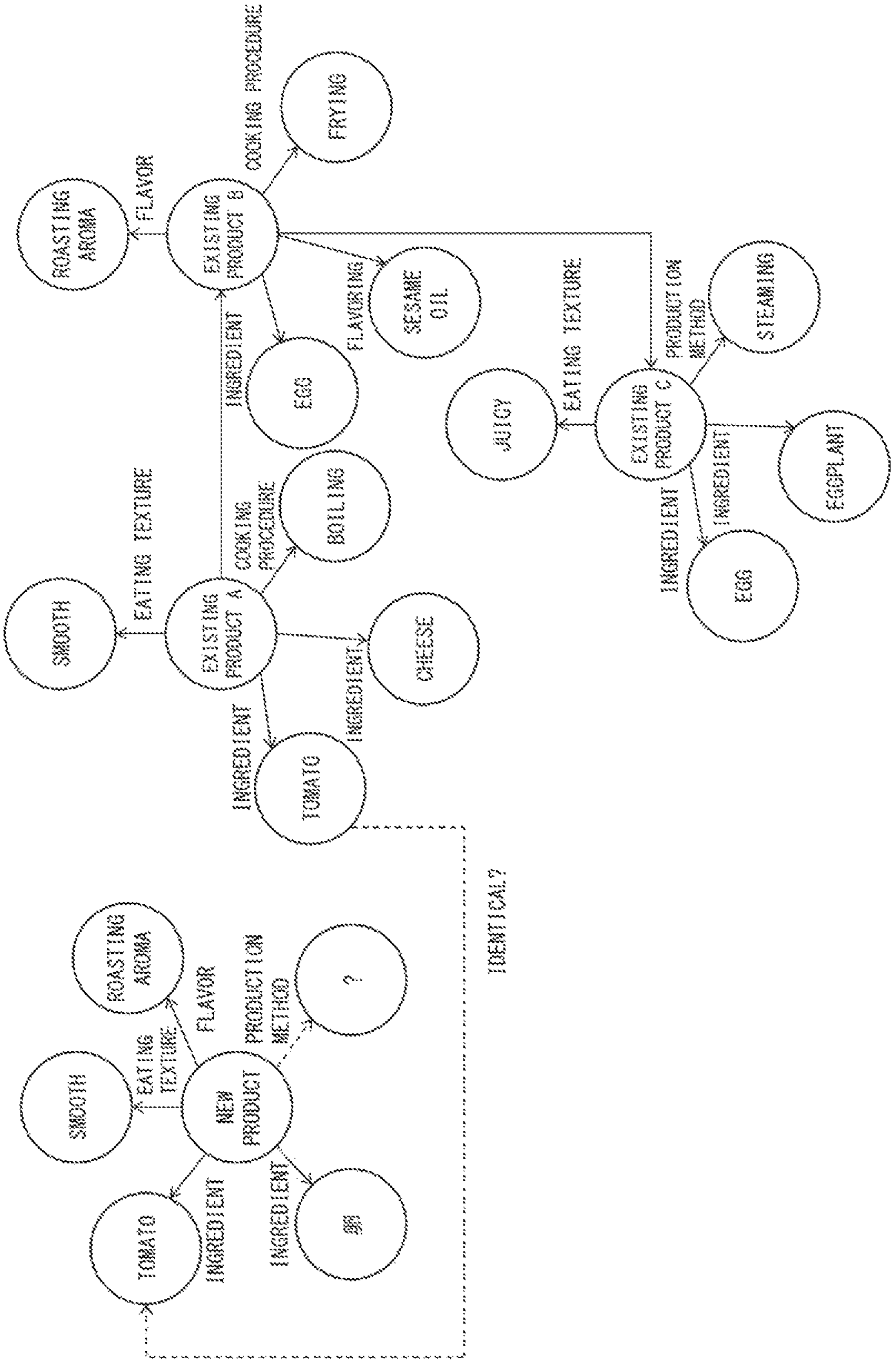
FIG. 6 is a schematic view illustrating an example of a prediction method carried out by a link prediction section in accordance with the second example embodiment of the present invention.

FIG. 6 is an explanatory diagram of a prediction method carried out by the link prediction section 203. In FIG. 6, an existing product graph is illustrated in which the existing products A to C are represented with use of nodes and edges, the nodes each representing an ingredient, a property, or a production method of the corresponding existing product, the edges each representing relationship between corresponding ones of the nodes. For example, a node “existing product A” and a node “smooth” are connected together via an edge indicating “eating texture”. This expresses the existing product A having a smooth eating texture.

The existing product graph illustrated in FIG. 6 contains the nodes of a plurality of existing products which are the existing products A to C. However, a graph the nodes of which are nodes regarding a single existing product alone may be referred to as the existing product graph. In this case, a similar product is identified with use of the plurality of existing product graphs corresponding to the plurality of respective existing products.

Such an existing product graph can be generated on the basis of ingredients, properties, and production methods of the respective existing products. In addition, with the learning of relations between (i) the ingredients and the properties indicated in the existing product graph and (ii) the method for producing the existing product indicated in the existing product graph, it is possible to infer relations between an ingredient and a property of a new product and the method for producing the existing product.

In FIG. 6, a new product graph is also illustrated which is represented with use of nodes and edges, the nodes each representing an ingredient, a property, or a production method of the new product, the edges each representing relationship between corresponding ones of the nodes. More specifically, the new product graph illustrated in FIG. 6 contains the nodes and the links which indicate that the new product has a “smooth” eating texture and a flavor of “roasting aroma”, and the nodes and the links which indicate that the ingredients of the new product include “tomato” and “egg”.

The graph generating section 202 generates the new product graph as described above, on the basis of the request regarding the new product accepted by the accepting section 201. This new product graph may be updated by referring to the result of the prediction made by the link prediction section 203, as the outline of the update has been described with use of FIG. 5.

The link prediction section 203 uses the new product graph and the existing product graph thus generated, to carry out a link prediction for predicting relationship between nodes which are not connected together via a link in the new product graph and the existing product graph. The link prediction section 203 carries out the link prediction, to predict a node to be linked to a node contained in the new product graph, from among, as an example, nodes which are contained in the existing product graph and each of which indicates an ingredient, a flavoring, or a production method used in the existing product.

For example, the node "tomato" in the new product graph and the node "tomato" in the existing product A are not connected together via a link, as indicated by dashed lines in FIG. 6. The link prediction section 203 can predict the probability that the relationship between the nodes is "identical", by carrying out a link prediction. On the basis of the predicted probability, the link prediction section 203 can then identify a node which is contained in the existing product graph and which is to be linked to a node contained in the new product graph. For example, the link prediction section 203 may identify, as a node to be linked to a node of the new product graph, a node of the existing product graph, the node having a predicted probability value equal to or greater than a threshold.

In addition, it is possible for the link prediction section 203 to predict, from among the nodes contained in an existing product graph containing a node which matches a preset condition or a condition set by a user, a node which indicates an ingredient, a flavoring, or a cooking procedure used in the existing product and which is to be linked to a node contained in the new product graph.

For example, it is possible for the link prediction section 203 to predict, from among the nodes contained in an existing product graph containing a node which matches the development concept of the new product, a node which indicates an ingredient, a flavoring, or a cooking procedure used in the existing product and which is to be linked to a node contained in the new product graph.

(Evaluation Method Carried Out by Evaluating Section)

Figures 7, 8:
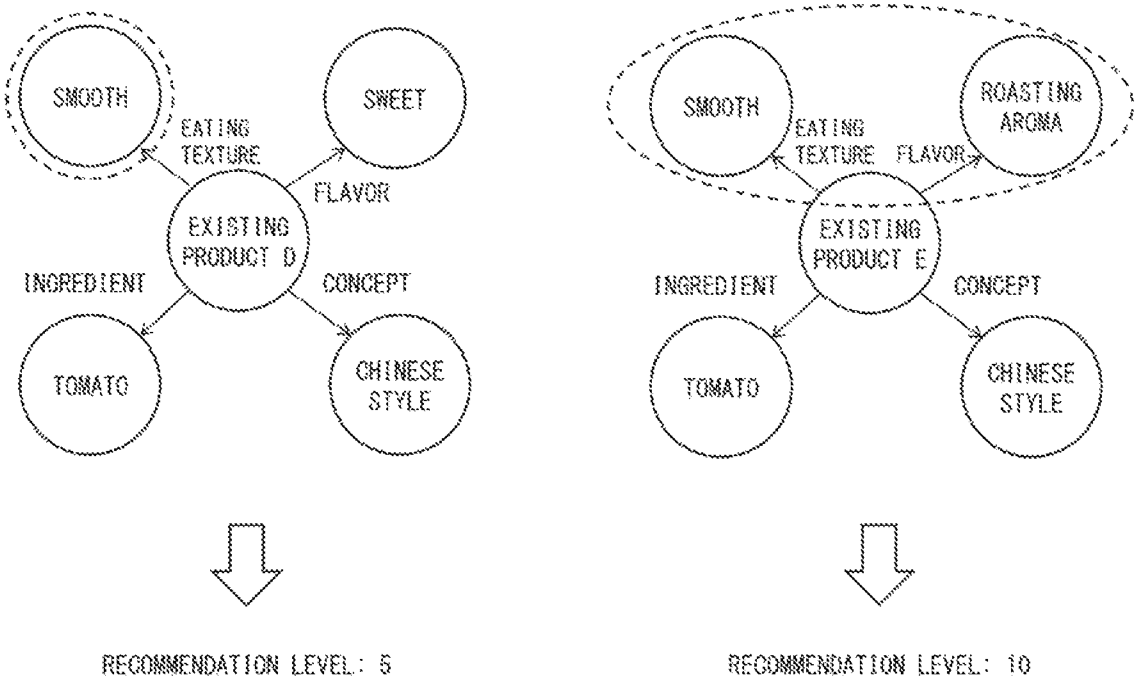
FIG. 7 is a schematic view illustrating an example of an evaluation method carried out by an evaluating section in accordance with the second example embodiment of the present invention.
FIG. 8 is a diagram illustrating an example of presentation carried out by an outputting section of the second example embodiment of the present invention.

FIG. 7 is a schematic view illustrating an example of an evaluation method carried out by the evaluating section 204. As described above, the evaluating section 204, as an example, refers to the request accepted by the accepting section 201, to identify a property which is indicated by the request and which a new product is required to have.

Taken as an example in FIG. 7 is a case where the properties which a new product is required to have include a smooth eating texture and a flavor of roasting aroma. Further, assume that the recommendation level when one property matches a request is set to "5", in this example.

The evaluating section 204 judges whether a node indicating a property which the new product is required to have is contained in an existing product graph containing a node predicted by the link prediction section 203. The evaluating section 204 then more highly evaluates the node predicted by the link prediction section 203 in a case where the node indicating a property which the new product is required to have is contained in the existing product graph containing a node predicted by the link prediction section 203 than in a case where the node indicating the property is not contained in the existing product graph containing the node predicted by the link prediction section 203.

In the example illustrated in FIG. 7, although an existing product graph D which contains a node predicted by the link prediction section 203 contains a node and a link which indicate that an existing product D has a "smooth" eating texture, which is a property thereof, the existing product graph D does not contain a node and a link which indicate that the existing product D has a flavor of "roasting aroma". In contrast, an existing product graph E, which contains a node predicted by the link prediction section 203, contains a node and a link which indicate that an existing product E has a "smooth" eating texture and a node and a link which indicate the existing product E has a flavor of "roasting aroma", as illustrated in FIG. 7.

In this case, the evaluating section 204 gives a higher evaluation to the existing product graph E than to the existing product graph D. In other words, the evaluating section 204 more highly evaluates the node (ingredient: tomato) predicted by the link prediction section 203 in a case where a node indicating a property which the new product is required to have is contained in an existing product graph containing the node (ingredient: tomato) predicted by the link prediction section 203 than in a case where the node indicating the property is not contained in the existing product graph.

As above, by determining, in advance, a degree to which a request is matched and the recommendation level according to the degree, it is possible for the evaluating section 204 to calculate the recommendation level of each existing product.

The evaluating section 204 may make higher the recommendation level of an existing product which has higher similarity to a new product. Assume, for example, that a new product graph contains nodes and links which indicate a plurality of ingredients of a new product. In this case, the recommendation level of an existing product which shares an ingredient in common with the new product may be made higher than that of an existing product which does not share an ingredient in common with the new product.

In addition to this, for example, the evaluating section 204 may make the evaluation such that the recommendation level of an existing product which is capable of being produced in production facilities available to a user is higher than that of an existing product which is incapable of being produced in the production facilities available to the user. The production facilities available to a user may be inputted as the request. The evaluating section 204 may also calculate a recommendation level by combining the above-described various evaluation measures of the recommendation level.

(Example of Presenting Production Method According to Request)

The outputting section 210 may output (i) the method for producing a new product inferred by the inferring section 207 according to the request accepted by the accepting section 201 and (ii) the recommendation level calculated by the evaluating section 204, in the form as illustrated in FIG. 8, for example. FIG. 8 is a diagram illustrating an example of presenting a method, according to a request, for producing a new product, together with a recommendation level.

Presented in the example of FIG. 8 are the production method (cooking procedure) inferred by the inferring section 207, an additional ingredient to be added to the ingredient contained in the request, the possibility of an allergy, and a recommendation level. Further, as illustrated in FIG. 8, the outputting section 210 may present the method for producing a new product inferred by the inferring section 207 for each category. Examples of a specific category include, but not limited to, a Japanese style, a Western style, and a Chinese style.

By presenting, to a user, information as illustrated in FIG. 6, it is possible for the user to understand an ingredient to be added to a new product and a production method.

(Method for Generating Basis Information)

Next, a basis information generation method carried out by the basis generating section 208 will be described below. As described above, various methods can be used as the basis information generation method. For example, in a case where the request accepted by the accepting section 201 contains information indicating the development concept of a new product or information indicating an ingredient used in the new product, the basis generating section 208 may generate, as the basis for the inference, basis information which contains information on an existing product the development concept of which is the same as that of the new product or information on an existing product in which an ingredient the same as that to be used in the new product is used. The outputting section 210 may then output the basis information generated.

The information on an existing product the development concept of which is the same as that required as the development concept of a new product or information on an existing product in which an ingredient the same as that to be used in the new product is used is promising information for making a judgment on whether the new product produced by the inferred production method matches the development concept or whether to use the ingredient in the new product.

With the above configuration, as the basis for the production method to be presented, an existing product the development concept of which is the same or in which the same ingredient is used is presented as the basis. This makes it possible for a user to easily understand the details of a new product and the method for making the new product.

The basis information generated by the basis generating section 208 may contain information which indicates the method for producing an existing product the development concept of which is the same as that of a new product or an existing product in which an ingredient the same as that to be used in the new product is used.

The existing product graph of an existing product the development concept of which is the same as that of a new product or an existing product in which an ingredient the same as that to be used in the new product is used contains a node which indicates the development concept or the ingredient. Thus, the basis generating section 208 may first identify an existing product graph which contains a node which indicates the development concept or the ingredient. The basis generating section 208 may then generate basis information which indicates a method for producing the existing product, the method being indicated in the existing product graph identified. For example, the basis generating section 208 may generate basis information which indicates at least one selected from the group consisting of a property, an ingredient, and a production method indicated in the existing product graph identified.

The method for producing an existing product the development concept of which is the same as that of a new product or an existing product in which an ingredient the same as that to be used in the new product is used is promising information for making a judgment on whether the new product produced by the inferred production method matches the development concept or whether the ingredient is used in the new product. Thus, with the above configuration, it is possible to provide a user with promising information for making a judgment on

- whether the inferred production method is effective in matching a new product with a desired development concept, or
- whether the inferred production method is effective in producing the new product in which a desired ingredient is used.

Further, the basis generating section 208 may generate the basis information on the basis of a result of the link prediction made by the link prediction section 203. As an example, the link prediction section 203 uses an existing product graph and a new product graph, to predict the probability that a node indicating a specific allergy is linked to a node contained in the new product graph. The basis generating section 208 then generates the basis information according to the probability predicted.

This enables the basis generating section 208 to generate the basis information which is illustrated in FIG. 8 as "possibility of an allergy". As illustrated in FIG. 8, the outputting section 210 presents the basis information based on a result of the prediction of the probability that a predetermined allergy appears in a new product, in addition to information indicating the method, inferred by the inferring section 12, for producing the new product.

The outputting section 210 outputs the basis information as illustrated in FIG. 8. This makes it possible to provide a user with promising information for making a judgment on whether there is a possibility that the inferred production method causes a predetermined allergy to appear in the new product.

(Generation of Basis for Link Prediction Result)

The basis generating section 208 can generate basis information also by analyzing a new product graph and an existing product graph. Here is a description of a method for generating basis information by analyzing a new product graph and an existing product graph.

For example, the basis generating section 208 may mine one or more rules from a new product graph and an existing product graph with use of principal component analysis (PCA) reliability based on open-world assumption (OWA). The basis generating section 208 may generate basis information using the one or more rules that have been mined. For example, a method described in the following literature can be applied to the rule mining.

Luis Galarraga et al, "Fast rule mining in ontological knowledge bases with AMIE+", The VLDB Journal (2015) 24: 707-730

As an example, a rule to be processed by the basis generating section 208 is expressed with use of Head r(x, y) and Body {B1, . . . , Bn} as follows:

$$B_1 \wedge B_2 \wedge \ldots \wedge B_n \Rightarrow r(x,y)$$

This rule may also be expressed in vector representation as follows:

$$\vec{B} \Rightarrow r(x,y)$$

Head r(x, y) is also referred to as atom.

As a condition of the mining process, the basis generating section 208 imposes the following conditions to carry out the mining process:

- Connected: all values (variables, entities) in a rule are shared between different atoms;
- Closed: all variables in a rule appear two times or more; and
- Not reflexive: a rule containing a reflective atom (such as r(x, x)) is not mined.

The basis generating section 208 may use a head coverage (hc) defined by $$hc\left(\vec{B} \Rightarrow r(x, y)\right) := \frac{supp\left(\vec{B} \Rightarrow r(x, y)\right)}{size(r)}$$

and PCA reliability defined by $$conf_{pen}\left(\vec{B} \Rightarrow r(x, y)\right) := \frac{supp\left(\vec{B} \Rightarrow r(x, y)\right)}{\#(x, y) : 3_{z_1, \ldots, z_m}, y' : \vec{B} \wedge r(x, y')}$$

to carry out the mining process. By using PCA reliability, it is possible to mine a highly accurate rule, as compared with a case of using standard reliability. Therefore, by using the above configuration, it is possible for the basis generating section 208 to generate highly reliable basis information.

Assume, for example, that the basis generating section 208 mines the following rule: regarding two products which satisfy a condition of "sharing a common concept with each other" or "sharing a common ingredient with each other", "an element included in the method for producing one of the two products can be applied to the method for producing the other". In this case, in a case where the link prediction section 203 predicts, as an element to be included in the method for producing a new product, an element included in the method for producing one existing product, the basis generating section 208 may generate, as the basis for this prediction, basis information which indicates that the one existing product and the new product "share a common concept with each other" or "share a common ingredient with each other".

Presenting the basis information as described above has an example advantage of making it possible for a user to easily understand the details of a new product and the method for making the new product.

(Flow of Process)

Figure 9:
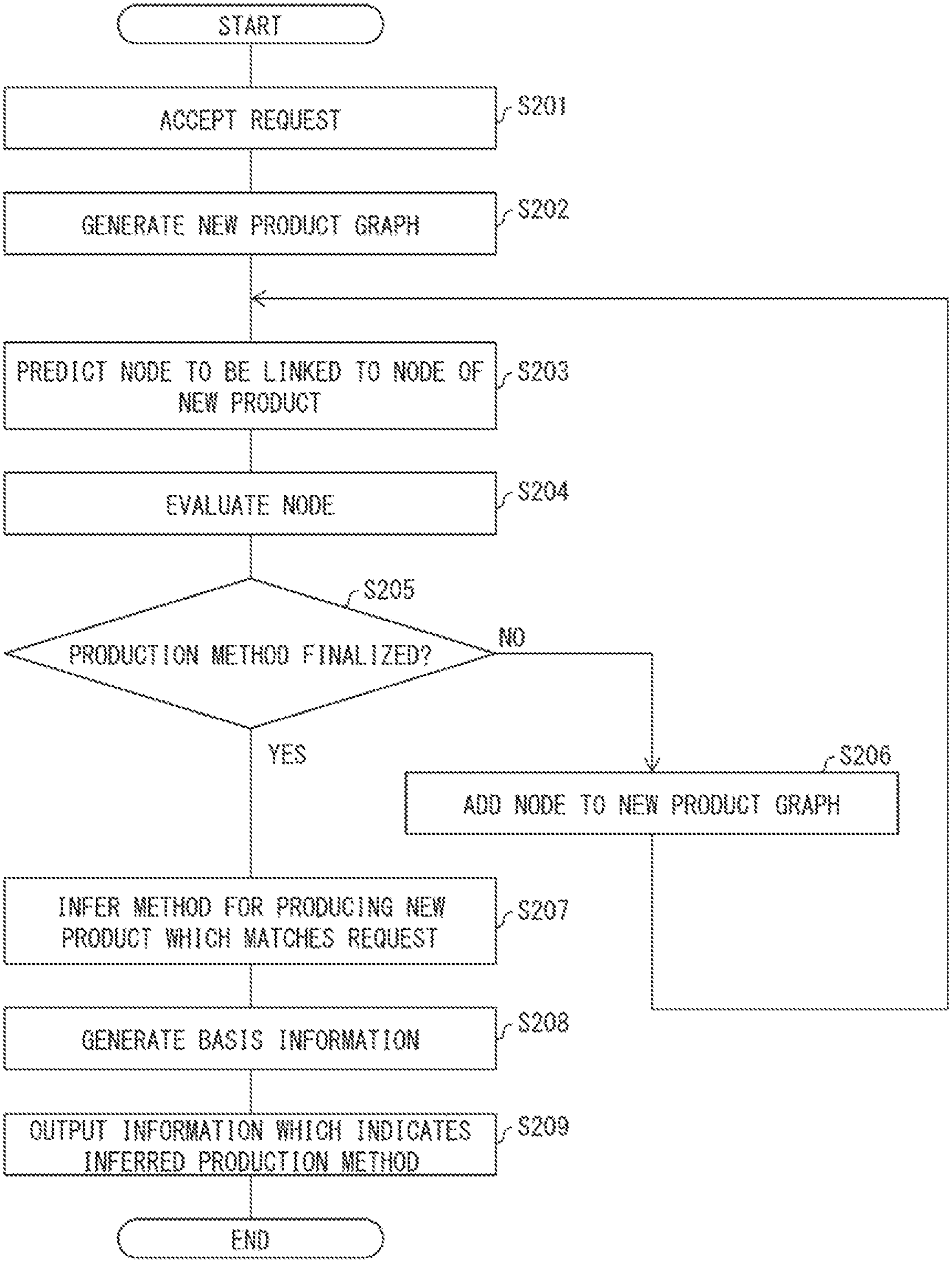
FIG. 9 is a flowchart illustrating a flow of a process carried out by a food development assistance apparatus 2 in accordance with the second example embodiment of the present invention.

A flow of a process (food development assistance method) carried out by the food development assistance apparatus 2 will be described below on the basis of FIG. 9. FIG. 9 is a flowchart illustrating a flow of a process carried out by the food development assistance apparatus 2.

In S201, the accepting section 201 accepts a request regarding the development of a new food product. In S201, for example, a request is accepted which indicates the commodity category of a new product which a user intends to produce, the development concept of the new product, a property of the new product, or an ingredient used in the new product. That is, the request contains at least one selected from the group consisting of, as an example, a commodity category, an ingredient, a development concept, and a property, as described above.

In S202, the graph generating section 202 generates a new product graph on the basis of the request inputted in S201. For example, the graph generating section 202 may generate the new product graph represented with use of nodes and edges, the nodes each representing the requested commodity category, development concept, property, ingredient, or production method of the new product, the edges each representing relationship between corresponding ones of the nodes.

By generating, in S202, the new product graph of a new product which matches all the properties indicated in the request accepted in S201, it is possible to infer a method for producing the new product. It should be noted that the new product graph in this stage only needs to contain nodes and links which indicate that the new product graph matches the above properties.

In S203, the link prediction section 203 predicts a node to be linked to a node contained in the new product graph generated in S202. As described above, a node to be linked to a node contained in the new product graph is predicted through a link prediction in which a learned existing product graph and the above new product graph are used.

In S203, the link prediction section 203 may predict, as an example, a node to be connected via the link "ingredient", "flavoring", or "production method" to the node "new product". In addition, a node to be connected to the node indicating an ingredient or flavoring, or the node indicating a production method may be predicted. For example, a node to be connected via a link "weight" to the node indicating an ingredient may be predicted, or a node to be connected via a link "heating time" to the node indicating cooking by heating. This makes it possible to also infer the details of an ingredient, a flavoring, and a production method of the new product.

In S204, the evaluating section 204 evaluates a node predicted in S203. For example, the evaluating section 204 refers to the accepted request, to identify a property which is indicated by the request and which the new product is required to have. The evaluating section 204 then judges whether a node indicating the property which the new product is required to have is contained in the existing product graph which contains the predicted node. The evaluating section 204 then more highly evaluates a node predicted by the link prediction section 203 in a case where the node indicating a property which the new product is required to have is contained in the existing product graph containing the predicted node than in a case where the node indicating the property is not contained in the existing product graph containing the predicted node. The evaluation is represented as, for example, a recommendation level, and when the evaluation is higher, a higher recommendation level is given.

In S205, the graph updating section 205 judges whether to finalize the method for producing the new product. In a case where it has been judged that the method is finalized here (YES in S205), the process proceeds to S207, and in a case where it has been judged that the method is not finalized here (NO in S205), the process proceeds to S206.

The condition for finalizing the production method in S205 may be set in advance. For example, a threshold of the number of nodes indicating ingredients and the threshold of the number of nodes indicating production methods may be set in advance, and in a case where each of these numbers of nodes contained in a new product graph is equal to or greater than the corresponding threshold, the production method may be finalized. As another example, whether to finalize the production method may be determined according to input from a user. In this case, the outputting section 210 preferably outputs the new product graph or the component and the production method indicated in the new product graph, to present these kinds of information to the user.

In S206, the graph updating section 205 adds a node and a link to the new product graph. The node and the link to be added may be determined according to input from a user, or may be determined by the graph updating section 205. It should be noted that in S206, the graph updating section 205 may replace a node contained in the current new product graph with another node according to input from a user.

When the node and the link are added to update the new product graph, the process returns to S203, and a node to be linked to a node contained in the updated new product graph is predicted. That is, in the process of FIG. 9, the prediction of a node in S203, the evaluation of the node in S204, and the update of a new product graph are repeatedly carried out until the judgment in S205 becomes YES.

In S207, the inferring section 207 infers the method for producing the new product which matches the request accepted in S201. Specifically, the inferring section 207 infers that the production method indicated in the new product graph at the time when the judgment in S205 becomes YES is the method for producing the new product graph which matches the request.

In S208, the basis generating section 208 generates basis information which indicates the basis for the inference in S207. Specifically, the basis generating section 208 may generate, as the basis for the inference, information which includes information on an existing product the development concept of which is the same as that of a new product, or information on an existing product in which an ingredient the same as that to be used in the new product is used.

In S209, the outputting section 210 outputs information which indicates the production method inferred in S207. Further, in this outputting, the outputting section 210 may also output the basis information generated in S208. With this, the process of FIG. 9 ends.

Third Example Embodiment

The following description will discuss a third example embodiment of the present invention in detail, with reference to the drawings. A food development assistance apparatus in accordance with the present example embodiment has the same configuration as the food development assistance apparatus 1 in accordance with the second example embodiment. However, the food development assistance apparatus in accordance with the present example embodiment differs from the food development assistance apparatus 1 in accordance with the second example embodiment in the processes carried out by a link prediction section 203 and an inferring section 207.

The link prediction section 203 in accordance with the present example embodiment uses a new product graph and an existing product graph to carry out a link prediction for predicting relationship between nodes which are not connected together via a link in the new product graph and the existing product graph, and identifies the existing product that has predetermined relationship with the new product. The inferring section 207 in accordance with the present example embodiment infers, based on the existing product identified by the link prediction section 203, a method for producing the new product which matches the request.

Information on an existing product having predetermined relationship with a new product to be developed is useful for the development of the new product. Thus, with the above configuration, it is possible to suitably assist the development of a new food product.

Figure 10:
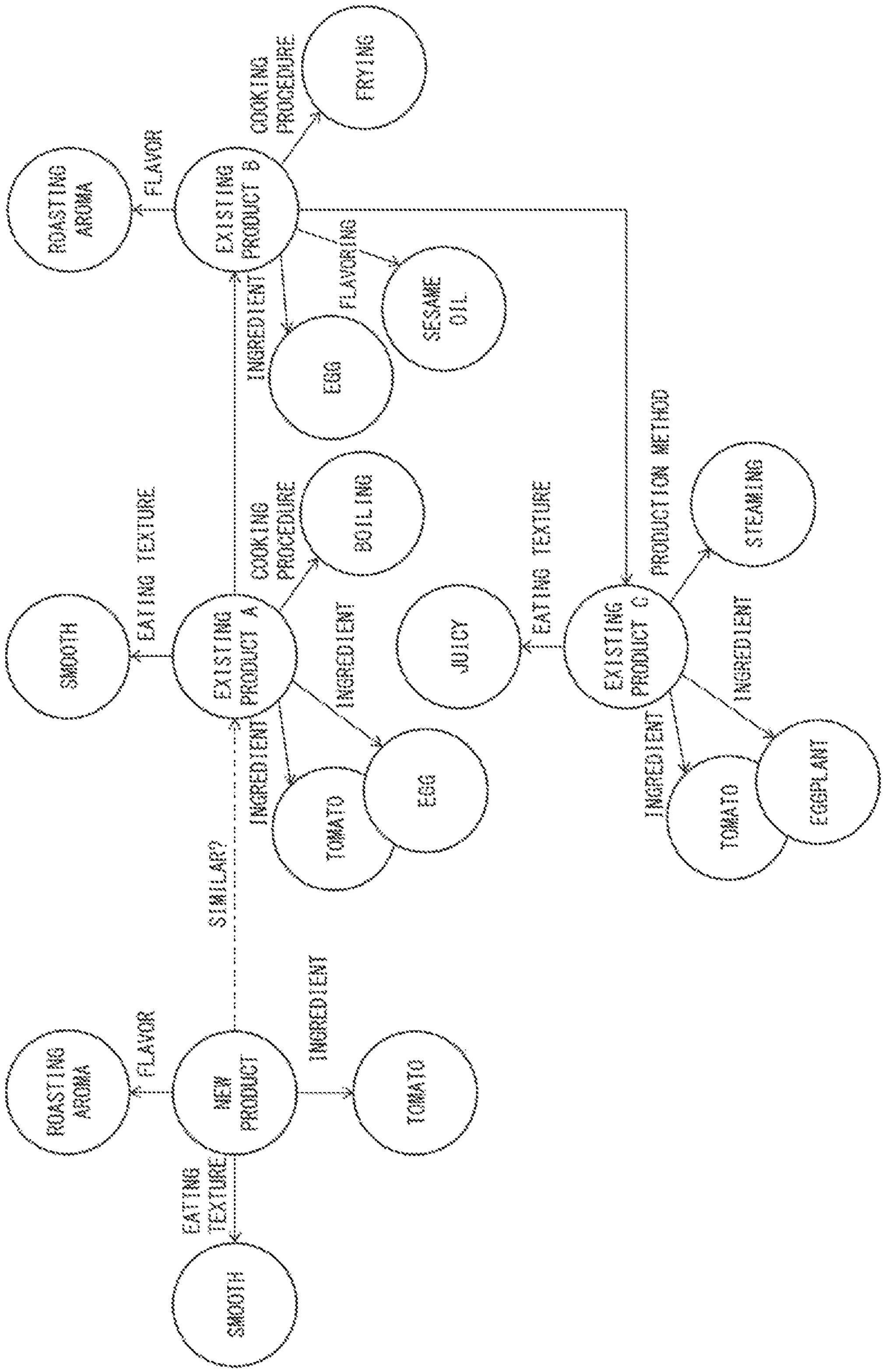
FIG. 10 is an explanatory diagram of a method for identifying an existing product having predetermined relationship with a new product, the method being carried out by a link prediction section in accordance with a third example embodiment of the present invention.

Here are descriptions of the processes carried out by the link prediction section 203 and the inferring section 207 in accordance with the present example embodiment, with reference to FIG. 10. FIG. 10 is an explanatory diagram of a method, carried out by the link prediction section 203 in accordance with the present example embodiment, for identifying an existing product having predetermined relationship with a new product. It should be noted that although taken as an example in FIG. 10 is a case where the "predetermined relationship" is relationship of "similarity", the present example embodiment is not limited to this.

(Identification of Similar Product)

FIG. 10 is an explanatory diagram of a method, carried out by the link prediction section 203, for identifying a similar product. Illustrated in FIG. 10 is an existing product graph in which existing products A to C are represented with use of nodes and edges, the nodes each representing an eating texture, an ingredient, a flavor, a flavoring, or a production method of the corresponding existing product, the edges each representing relationship between corresponding ones of the nodes. For example, a node "existing product A" and a node "smooth" are connected together via an edge indicating "eating texture". This expresses the existing product A having a smooth eating texture.

The existing product graph illustrated in FIG. 10 contains the nodes of a plurality of existing products which are the existing products A to C. However, a graph the nodes of which are nodes regarding a single existing product alone may be referred to as the existing product graph. In this case, a similar product is identified with use of the plurality of existing product graphs corresponding to the plurality of respective existing products.

Such existing product graphs can be generated on the basis of, for example, the eating textures, the ingredients, the flavors, the flavorings, or the production methods of the respective existing products. In addition, by learning, in advance, relations between an eating texture, an ingredient, a flavor, a flavoring, etc. indicated in the existing product graph and the method of producing an existing product, it is possible to infer relations between an eating texture, an ingredient, a flavor, a flavoring, etc. of a new product and the method for producing the existing product.

In FIG. 10, a new product graph is also illustrated, the new product graph being represented with use of nodes and edges, the nodes each representing an eating texture, an ingredient, a flavor, a flavoring, a production method, etc. of the new product, the edges each representing relationship between corresponding ones of the nodes. More specifically, the new product graph illustrated in FIG. 10 contains a node and a link which indicate that the new product has a "smooth" eating texture, a node and a link which indicate that the new product has a flavor of "roasting aroma", and a node and a link which indicate that the ingredients used in the new product include "tomato".

The graph generating section 202 generates the new product graph as described above, on the basis of the request regarding the new product accepted by the accepting section 201. That is, in a case of acceptance of a request that the new product should have a smooth eating texture and a flavor of roasting aroma, and the ingredients used in the new product should include tomato, a new product graph as illustrated in FIG. 10 is generated.

By using the new product graph and the existing product graph thus generated, it is possible for the link prediction section 203 to identify an existing product having predetermined relationship with the new product. For example, it is possible to not only identify an existing product which is similar to a new product, but also identify an existing product which is dissimilar to a new product, an existing product which belongs to the same classification as a new product, an existing product which shares efficacy in common with a new product, and any other existing product.

The above identification can be implemented by a link prediction for predicting relationship between nodes which are not connected together via a link in a new product graph and an existing product graph. For example, the node "new product" of the new product graph and the node "existing product A" of the existing product graph are not connected together via a link, as indicated by dashed lines in FIG. 10.

The link prediction section 203 can predict a probability that the relationship between these nodes is "similarity", by carrying out the link prediction. In addition, the link prediction section 203 can predict, in the same manner, a probability that relationship between the node "new product" and the node indicating the existing product B or C contained in the existing product graph is "similarity". The link prediction section 203 can then identify a similar product on the basis of the predicted probabilities. For example, the link prediction section 203 may identify, as a similar product, an existing product the predicted probability for which is equal to or greater than a threshold.

The link prediction section 203 can also identify an existing product which matches a preset condition or a condition set by a user, as an existing product having predetermined relationship with the new product. For example, it is possible to identify, as a similar product, an existing product sharing at least some of the ingredients in common with the new product, and it is also possible to identify, as a similar product, an existing product sharing at least a part of the production method in common with the new product.

The inferring section 207 infers the method for producing the new product which matches the request, on the basis of the existing product identified as described above by the link prediction section 203. Information on an existing product having predetermined relationship with a new product to be developed is useful for the development of the new product. Thus, with the above configuration, it is possible to suitably assist the development of a new food product.

Fourth Example Embodiment

The following description will discuss a configuration of a food development assistance apparatus 3 in accordance with a fourth example embodiment of the present invention, with reference to drawings. The food development assistance apparatus 3 assists the development of a new product with use of a base product. In some cases, in a method for developing a new product, the new product is developed on the basis of a base product which is considered preferable. The food development assistance apparatus 3 assists the development of a new product in such cases.

(Outline)

Figure 11:
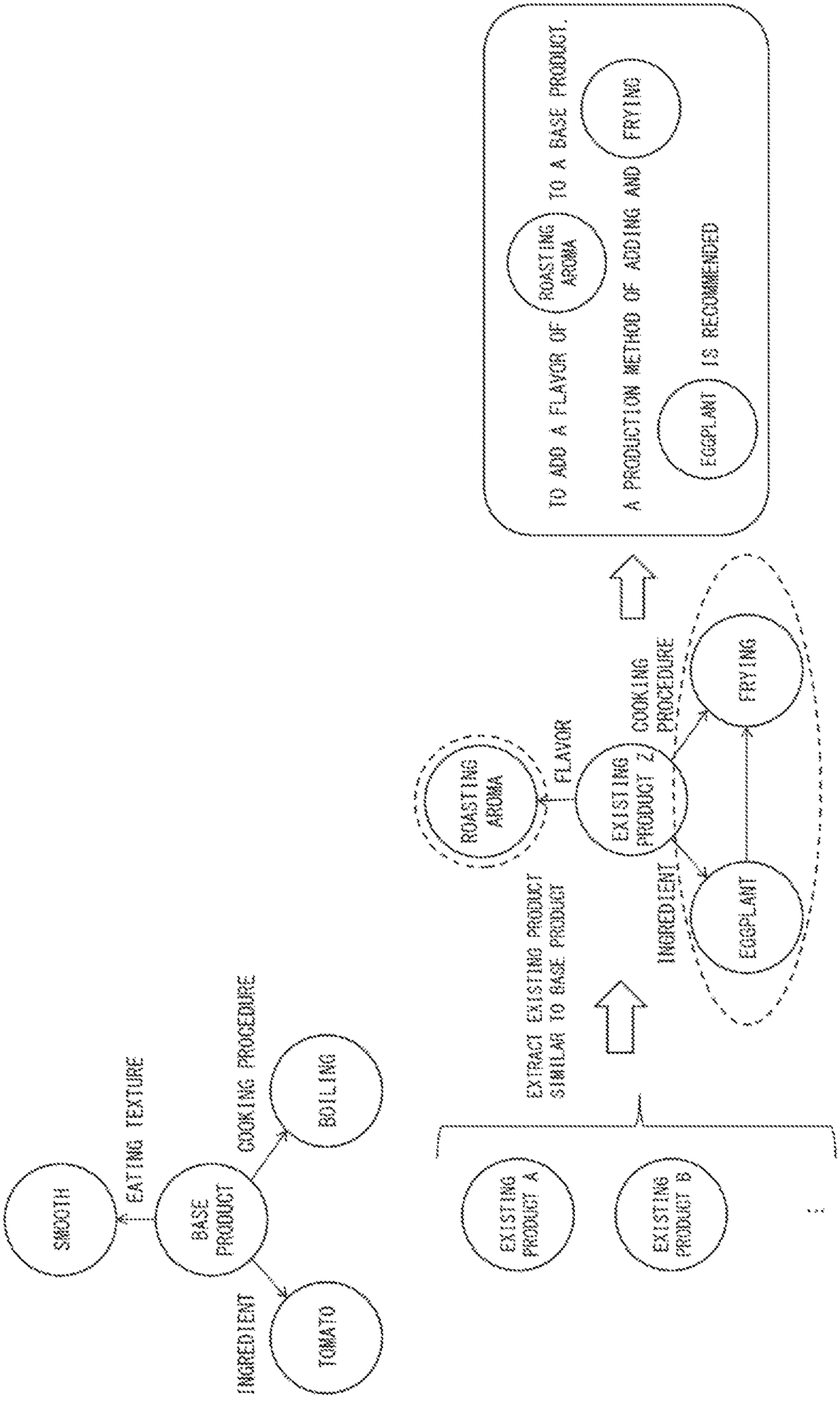
FIG. 11 is a diagram illustrating the outline of a food development assistance method in accordance with a fourth example embodiment of the present invention.

FIG. 11 is a diagram illustrating the outline of a food development assistance method in accordance with the present example embodiment. According to the present example embodiment, an example will be described below in which the development of a new food product is assisted with use of a base product graph and an existing product graph. Although nodes such as an existing product A and an existing product B are illustrated in FIG. 11, the other nodes that are contained in the existing product graph are omitted. The existing product graph used in the present example embodiment is the same as the diagram illustrated in the right part of FIG. 5 described in the second example embodiment.

The base product graph is a graph which contains a plurality of nodes regarding the production of the base product on which a new product to be developed is to be based. The base product graph illustrated in FIG. 11 contains a node indicating that the base product has a “smooth” eating texture, a node indicating that the ingredients include “tomato”, and a node and a link which indicate that the production is carried out by boiling, which is a “cooking procedure”. Such a base product graph can be generated on the basis of an eating texture, an ingredient, a flavor, a flavoring, a cooking procedure, etc. of the base product.

For example, by accepting input of an eating texture, an ingredient, a flavor, a flavoring, a cooking procedure, etc. of the base product in the form of a request from a user, it is possible to generate the base product graph. In the generating, a request regarding, for example, an eating texture which the new product, based on the base product, is required to have may also be accepted. Further, a user may select an existing product which should be the base product, from among existing products indicated in the existing product graph. In this case, the existing product graph of the selected existing product may be used as the base product graph.

In the food development assistance method in accordance with the present example embodiment, an existing product having predetermined relationship with the base product is identified with use of the base product graph and the existing product graph, through a link prediction for predicting relationship between nodes which are not connected together via a link in the base product graph and the existing product graph. The method for producing the new product which is based on the base product and which matches the request is then inferred based on the method for producing the identified existing product.

The method for producing an existing product which has predetermined relationship with a base product is information useful for inferring the method for producing a new product which is based on the base product and which matches the request. Accordingly, with the food development assistance method in accordance with the present example embodiment, it is possible to infer a method for producing a new product which matches a request, in consideration of this useful information.

With a link prediction, it is possible to identify an existing product having various kinds of relationship with a base product. For example, it is possible to not only identify an existing product which is similar to a base product, but also identify an existing product which is dissimilar to a base product, an existing product which belongs to the same classification as a base product, an existing product which shares an eating texture in common with a base product, and any other existing product.

In FIG. 11, an example of identifying an existing product similar to a base product is illustrated. Specifically, in the example of FIG. 11, an existing product Z is identified as the existing product similar to the base product, from among a plurality of existing products illustrated in the existing product graph, and the existing product graph of the existing product Z is extracted.

The existing product graph of the existing product Z extracted as described above contains a node indicating that the existing product Z has a flavor of “roasting aroma”, a node indicating that the ingredients include “eggplant”, and a node and a link which indicate that the production is performed with use of “frying” which is the cooking procedure. It can be understood from these nodes that the existing product Z is similar to the base product, but has a flavor of roasting aroma which the base product does not have. Further, it can be said that this flavor is due to the cooking procedure, which is frying eggplant which is an ingredient that is not contained in the base product.

On the basis of the above, a production method of adding eggplant and frying the eggplant is recommended in order to add the flavor of roasting aroma to the base product, in the example of FIG. 11. As above, with the food development assistance method in accordance with the present example embodiment, it is possible to infer and recommend the method for producing a new product which matches a request from a user.

(Configuration of Apparatus)

Figure 12:
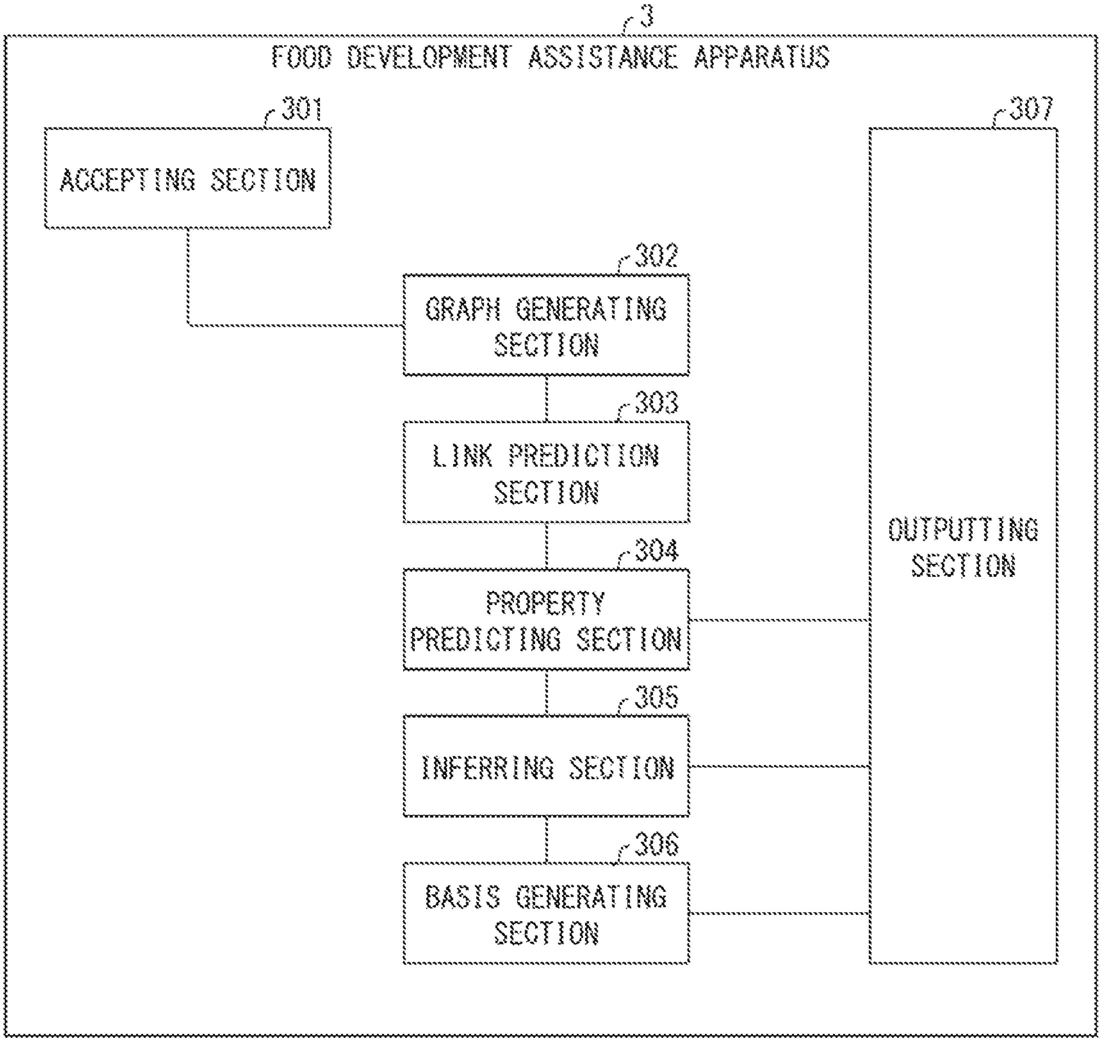
FIG. 12 is a block diagram illustrating a configuration of a food development assistance apparatus in accordance with the fourth example embodiment of the present invention.

A configuration of the food development assistance apparatus 3 in accordance with the present example embodiment will be described below on the basis of FIG. 12. FIG. 12 is a block diagram illustrating a configuration of the food development assistance apparatus 3 of the present example embodiment.

The food development assistance apparatus 3 includes an accepting section 301, a graph generating section 302, a link prediction section 303, a property predicting section 304, an inferring section 305, a basis generating section 306, and an outputting section 307, as illustrated. In addition to these components, the food development assistance apparatus 3 may include, for example, input equipment via which to accept an input operation of a user, output equipment via which the food development assistance apparatus 3 outputs data, and communication equipment via which the food development assistance apparatus 3 communicates with another apparatus, as in the food development assistance apparatus 2 of the second example embodiment.

The accepting section 301 accepts a request regarding the development of a new food product. This request may contain, for example, an eating texture or a flavor which the new product is required to have, an ingredient or a flavoring to be used in the new product, and the method for producing the new product. This request may contain, for example, information for identifying a base product on which the new product is to be based, and an eating texture, an ingredient, a flavor, a flavoring, or a production method.

The graph generating section 302 generates a base product graph in which the base product graph is represented as a graph, on the basis of the above information on the base product. Specifically, the graph generating section 302 generates the base product graph in which the base product is represented with use of nodes and edges, the nodes each representing an eating texture, an ingredient, a flavor, a flavoring, or a production method of the base product, the edges each representing relationship between corresponding ones of the nodes. In a case where the base product graph is contained in the existing product graph, the graph generating section 302 may extract the base product graph from the existing product graph.

The link prediction section 303 identifies an existing product having predetermined relationship with the base product, with use of the base product graph which contains a plurality of nodes regarding the production of the base product on which the new product to be developed is to be based and a plurality of existing product graphs generated for the plurality of respective existing products, through a link prediction for predicting relationship between nodes which are not connected together via a link in the base product graph and the existing product graph. Hereinafter, an existing product similar to a base product is referred to as a similar product. As describes above, with a link prediction, it is possible to identify, in addition to an existing product having relationship of similarity, an existing product having any other relationship with the base product.

The property predicting section 304 predicts a property (such as eating texture or flavor) which can be added to the base product. Specifically, the property predicting section 304 refers to the existing product graph of the similar product, identified by the link prediction section 303, of the base product, to predict a property which is included in the properties indicated in the existing product graph and which the base product does not have, as a property which can be added to the base product.

The inferring section 305 infers, based on the existing product identified by the link prediction section 303, a method for producing the new product which matches the request. The method for producing the new product which matches the request accepted by the accepting section 301, is inferred based on the request and a learned model which has learned a relation between an eating texture, an ingredient, a flavor, or a flavoring of the existing product and the method for producing the existing product. Specifically, the learned model is the existing product graph described above. Since, as described above, the link prediction section 303 carries out a link prediction with use of the existing product graph, inference based on the learned model is implemented by the inferring section 305 carrying out the above inference on the basis of a result of the link prediction carried out by the link prediction section 303.

The basis generating section 306 generates basis information indicating the basis for the inference made by the inferring section 305. Since the basis generating section 306 is the same as the basis generating section 208 described in the second example embodiment, the detailed description thereof is omitted.

The outputting section 307 outputs various kinds of information generated by the food development assistance apparatus 3, such as information indicating the production method inferred by the inferring section 305. Like the outputting section 210 described in the second example embodiment, the destination to which the outputting section 307 outputs the information is not particularly limited.

As above, the food development assistance apparatus 3 includes the link prediction section 303, which identifies an existing product having predetermined relationship with the base product, with use of a base product graph which contains a plurality of nodes regarding the production of a base product on which a new product to be developed is to be based and a plurality of existing product graphs generated for the plurality of respective existing products, through a link prediction for predicting relationship between nodes which are not connected together via a link in the base product graph and the existing product graph. The inferring section 305 infers, based on the existing product identified by the link prediction section 303, a method for producing the new product which matches the request.

With the above configuration, an existing product having predetermined relationship with a base product is identified, and a method for producing a new product which matches the request is inferred based on the identified existing product. Information on an existing product having predetermined relationship with a base product on which a new product is to be based is useful for the development of the new product. Therefore, with the above configuration, it is possible to contribute to the development of a new food product carried out with use of a base product.

(Flow of Process)

Figure 13:
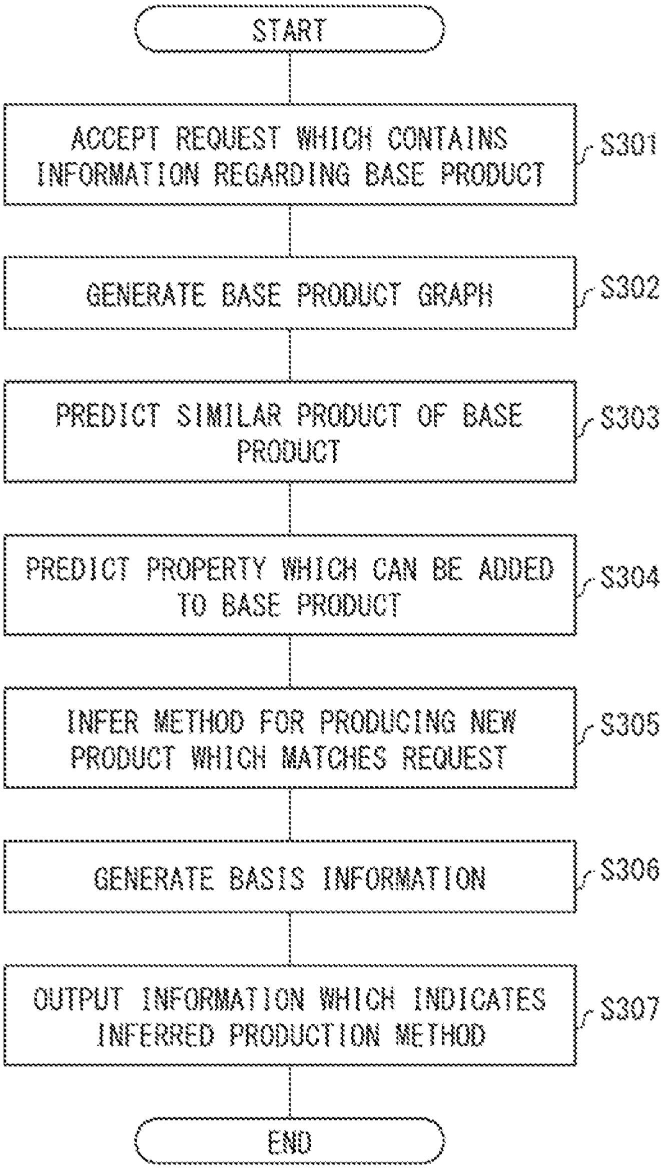
FIG. 13 is a flowchart illustrating a flow of a process carried out by the food development assistance apparatus in accordance with the fourth example embodiment of the present invention.

A flow of a process (food development assistance method) carried out by the food development assistance apparatus 3 will be described below on the basis of FIG. 13. FIG. 13 is a flowchart illustrating a flow of a process carried out by the food development assistance apparatus 3.

In S301, the accepting section 301 accepts a request regarding the development of a new food product. Assume that in this process, the accepted request contains information regarding the base product. The information regarding the base product only needs to be information enough for the generation of a base product graph in the next S302. For example, information indicating an eating texture, an ingredient, a flavor, a flavoring, a production method, etc. of the base product may be accepted as the request.

In S302, the graph generating section 302 generates a base product graph on the basis of the information inputted in S301. For example, in a case where input of an eating texture, an ingredient, and a cooking procedure of the base product is accepted in S301, the graph generating section 302 may generate the base product graph which contains a node and a link indicating each of the eating texture, the ingredient, and the cooking procedure.

In S303, the link prediction section 303 carries out a link prediction with use of the existing product graph which has undergone learning in advance and the base product graph generated in S302, to predict (identify) a similar product of the base product.

In S304, the property predicting section 304 predicts a property which can be added to the base product, on the basis of a result of the identification carries out in S303. Specifically, the property predicting section 304 refers to the existing product graph of the similar product, identified in S303, of the base product, to predict, from among the properties indicated in the existing product graph, a property which the base product does not have, as the property which can be added to the base product.

In this respect, the outputting section 307 may output properties predicted by the property predicting section 304 to present the properties to a user, to cause the user to select, from among the presented properties, a property which the new product is required to have. In this case, the accepting section 301 accepts, as the request, the property selected by the user.

The request accepted in S301 may contain an eating texture, a flavor, etc. which the new product is required to have. In this case, the property predicting section 304 carries out the process of S304, and then judges whether the requested eating texture, flavor, etc. are included in the predicted properties. In a case where the property predicting section 304 has judged that the requested eating texture, flavor, etc. are not included, the outputting section 307 may be caused to output an indication that a method for producing a new product which has the requested eating texture, flavor, etc. could not be inferred, and the process of FIG. 13 may be ended.

In S305, the inferring section 305 infers an element of the production method to be applied to the base product. Specifically, the inferring section 305 refers to the existing product graph, to identify an existing product having a property which matches the request, from among the existing products identified in S303 as being similar products of the base product. In this respect, the request means the request accepted in S301 or the request based on the result of the prediction carried out in S304. Further, in this process, the inferring section 305 does not need to identify an existing product which has all the requested properties, and may identify an existing product which has at least some of the requested properties.

The inferring section 305 then refers to the existing product graph of an existing product inferred in S305, to infer an element which is included in the elements contained in the method for producing the existing product and which is not contained in the method for producing the base product, as an element of the method for producing the new product. The production method that contains this element is the result of the inference of the method for producing the new product which matches the request.

In S306, the basis generating section 306 generates basis information which indicates the basis for the inference carried out in S305. Specifically, the basis generating section 306 may generate the basis information which contains information on an existing product having the same property that the new product is required to have, and this basis for producing the existing product having the same property that the new product is required to have. For example, the basis generating section 306 may generate the basis information which is the product name of the existing product (the existing product having a property which matches the request, among the existing products identified as being similar products of the base product) identified in S305 and the method, indicated in the existing product graph, for producing the existing product.

In S307, the outputting section 307 outputs information indicating the production method inferred in S305. In this outputting, the outputting section 307 may also output the basis information generated in S306. With this, the process illustrated in FIG. 13 ends.

As above, the inferring section 305 may infer an element which is included in the elements contained in the method for producing a similar product, identified by the link prediction section 303 in S303, of the base product and which is not contained in the method for producing the base product, as an element of the method for producing the new product.

An element which is contained in the method for producing an existing product similar to the base product but is not contained in the method for producing the base product is highly likely to be an element which matches the method for producing the base product. Therefore, with the above configuration, it is possible to infer an element highly likely to match the method for producing the base product, as an element of the method for producing a new product.

Furthermore, various conditions can be set for the link prediction carried out in S303. For example, the link prediction section 303 may identify an existing product which is similar to the base product and which has at least one of the properties which the new product is required to have. The properties which the new product is required to have may be identified on the basis of the request accepted in S301.

Information on such an existing product is highly useful for inference of a method for producing the new product having the properties. Therefore, with the above configuration, it is possible to accurately infer a method for producing food having a desired property. It should be noted that in a case of the configuration in which an existing product having a predetermined property is identified in S303 as described above, the process of S304 may be omitted.

Further, in S303, the link prediction section 303 may identify the method for producing an existing product which is similar to the base product and which has a property which matches the request, through a link prediction carried out with use of the base product graph and the existing product graph. In this case, the inferring section 305 may infer an element contained in the production method thus identified, as an element of the method for producing the new product. The relation of similarity between products is learned at the time of training the existing product graph, without carrying out a step of identifying a similar product. Therefore, the above link prediction makes it possible to identify a method for producing an existing product having a property which matches a request. In this case, the processes of S303 to S306 are omitted.

Fifth Example Embodiment

The following description will discuss a configuration of a food development assistance apparatus 4 in accordance with a fifth example embodiment of the present invention, with reference to drawings. The food development assistance apparatus 4 assists the development of a new product having a desired property. In some cases, in a method for developing a new product, a product having a property which is considered to be desired by a consumer is developed. The food development assistance apparatus 4 assists the development of a new product in such cases.

(Outline)

Figure 14:
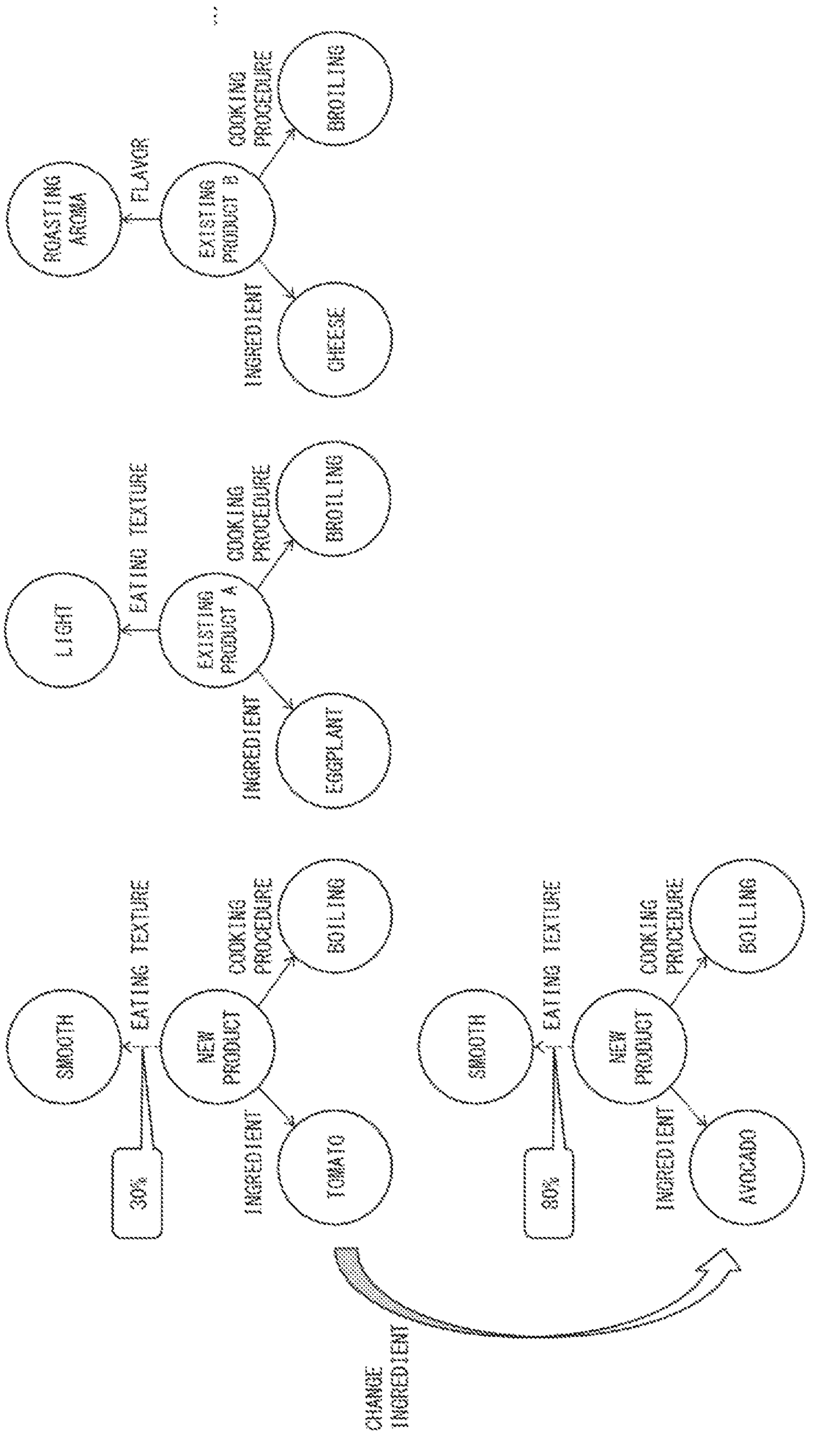
FIG. 14 is a diagram illustrating the outline of a food development assistance method in accordance with a fifth example embodiment of the present invention.

FIG. 14 is a diagram illustrating the outline of a food development assistance method in accordance with the present example embodiment. According to the present example embodiment, an example will be described below in which the method for producing a new product which matches a request is inferred while a new product graph is updated.

According to the present example embodiment, as in the second example embodiment, a link prediction is carried out with use of a new product graph and an existing product graph. A new product graph illustrated in the upper left part of FIG. 14 contains nodes and links which indicate that the ingredients of a new product include "tomato" and the cooking procedure of the new product is "boiling".

An existing product graph illustrated in the upper center part of FIG. 14 contains nodes and links which indicate that an existing product A has a "light" eating texture, the ingredients of the existing product A include "eggplant", and the cooking procedure of the existing product A is "broiling". Similarly, an existing product graph illustrated in the upper right part of FIG. 14 contains nodes and links which indicate that an existing product B has a flavor of "roasting aroma", the ingredients of the existing product B include "cheese", and the cooking procedure of the existing product B is "broiling".

By training the existing product graph of each of the various existing products described above, it is possible to carry out link predictions of a property and a product having the property. That is, in the food development assistance method in accordance with the present example embodiment, a new product graph is provisionally set, and a link prediction of a probability that the new product indicated in the new product graph has a requested property is carried out.

For example, in the example of FIG. 14, a probability that a node "smooth" is connected via a link "eating texture" to a node "new product graph" of the new product graph illustrated in the upper left part is predicted to be 30%. It cannot be said that this probability is sufficiently high.

To address this, as illustrated in the lower left part of the same figure, a node connected via a link "ingredient" to the node "new product" of the new product graph is changed from "tomato" to "avocado", and a link prediction is carried out again. This changes the result of a prediction of the probability that the node "smooth" is connected via the link "eating texture" to the node "new product" to 80%.

Therefore, with the food development assistance method in accordance with the present example embodiment, use of "avocado" can be recommended as an approach to imparting a smooth eating texture to the new product. It should be noted that although replacement of an ingredient is carried out in the example of FIG. 14, addition of an ingredient can also be carried out. Similarly, a method for producing the new product which matches a request can also be recommended.

(Configuration of Apparatus)

Figure 15:
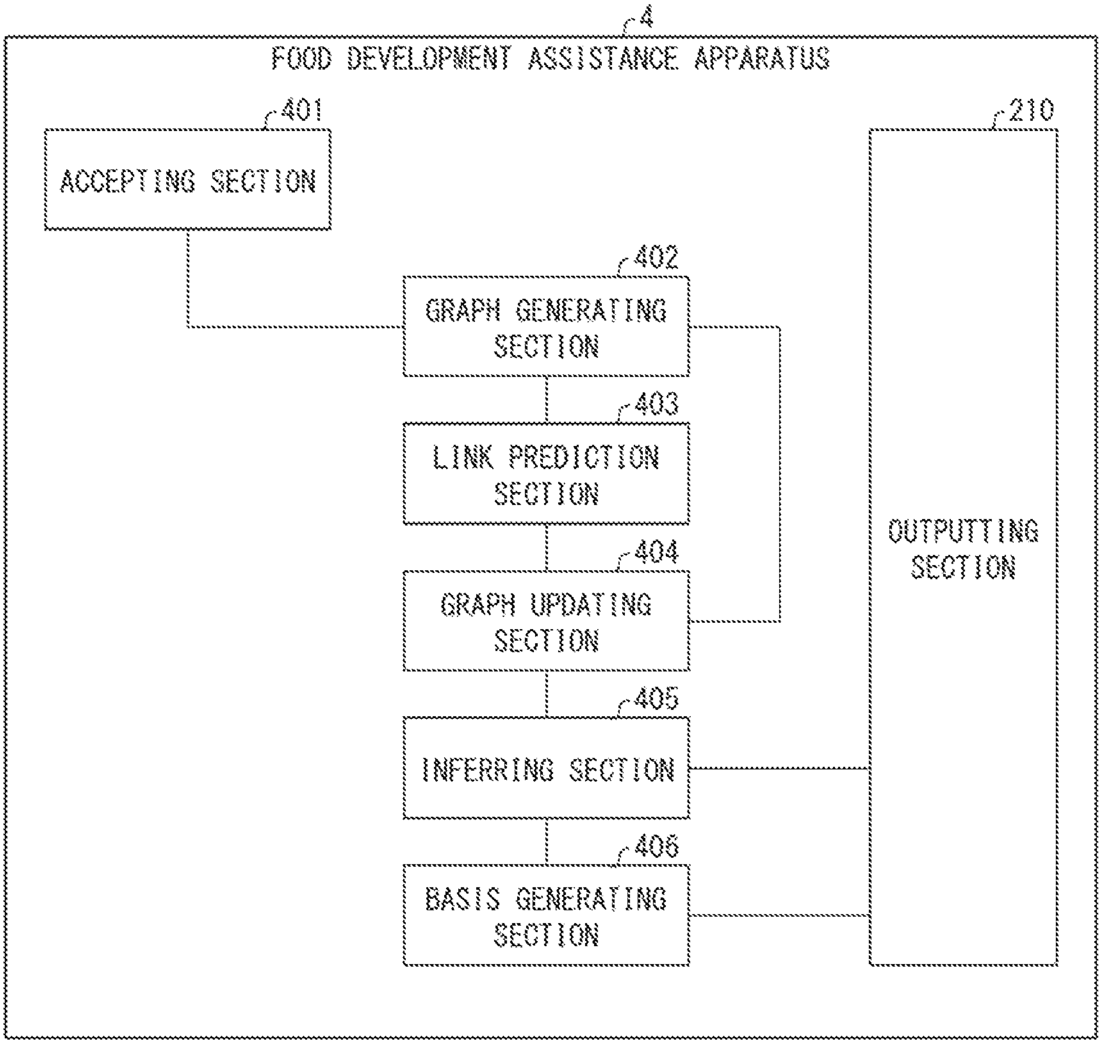
FIG. 15 is a block diagram illustrating a configuration of a food development assistance apparatus in accordance with the fifth example embodiment of the present invention.

A configuration of the food development assistance apparatus 4 in accordance with the fifth example embodiment of the present invention will be described below on the basis of FIG. 15. FIG. 15 is a block diagram illustrating a configuration of the food development assistance apparatus 4 of the present example embodiment.

The food development assistance apparatus 4 includes an accepting section 401, a graph generating section 402, a link prediction section 403, a graph updating section 404, an inferring section 405, a basis generating section 406, and an outputting section 210, as illustrated. In addition to these components, the food development assistance apparatus 4 may include, for example, input equipment via which to accept an input operation of a user, output equipment via which the food development assistance apparatus 4 outputs data, and communication equipment via which the food development assistance apparatus 4 communicates with another apparatus, as in the food development assistance apparatus 2 of the second example embodiment.

The accepting section 401 accepts a request regarding development of a new food product. This request may contain, for example, a property (such as eating texture or a flavor) which a new product is required to have, an ingredient or a flavoring to be used in the new product, and a production method to be used at the time of producing the new product. This request may also contain, for example, a threshold for the probability that required efficacy is expressed in the new product.

Like the graph generating section 202 of the second example embodiment, the graph generating section 402 generates a new product graph in which a new product which a user intends to produce is represented as a graph, on the basis of information on the new product.

The link prediction section 403 calculates a probability that a node indicating a predetermined property is linked to a node contained in a new product graph which contains a plurality of nodes regarding production of a new product to be developed, with use of the new product graph and an existing product graph, through a link prediction for predicting relationship between nodes which are not connected together via a link in the new product graph and the existing product graph. The predetermined property is a property which matches the request accepted by the accepting section 401.

The graph updating section 404 updates the new product graph. Specifically, the graph updating section 404 carries out either a process of replacing a node contained in the new product graph with another node or a process of adding a new node to the new product graph, or both the process of replacing and the process of adding.

The update of the new product graph may be carried out according to the input of a user, or may be automatically carried out. In the former case, the graph updating section 404 may cause the outputting section 210 to output a list of nodes which are all the nodes contained in the current new product graph, or a list of candidate nodes to be added to the new product graph or to replace a node of the current new product graph. In the latter case, the graph updating section 404 may select a node to be added, from among these candidate nodes. The candidate nodes may be extracted from the existing product graph of an existing product having the requested property.

The inferring section 405 infers, based on the probability calculated by the link prediction section 403, a method for producing the new product which matches the request. That is, the inferring section 405 infers, based on the request accepted by the accepting section 401 and a learned model which has learned a relation between an ingredient, a flavoring, a property, etc. of the existing product and the method for producing the existing product, a method for producing the new product which matches the request. Specifically, the learned model is the existing product graph described above. Since, as described above, the link prediction section 403 carries out a link prediction with use of the existing product graph, the inference made by the inferring section 405, which carries out the above inference on the basis of a result of the link prediction carried out by the link prediction section 403, is based on a learned model.

The basis generating section 406 generates basis information indicating the basis for the inference made by the inferring section 405. Since the basis generating section 406 is the same as the basis generating section 208 of the second example embodiment, the detailed description thereof is omitted.

The outputting section 210 outputs various kinds of information generated by the food development assistance apparatus 4, such as information indicating the production method inferred by the inferring section 405. Like the outputting section 210 of the second example embodiment, the destination to which the outputting section 210 outputs the information is not particularly limited.

As described above, the food development assistance apparatus 4 includes a link prediction section 403 for calculating the probability that a node indicating a predetermined property is linked to a node contained in a new product graph which contains a plurality of nodes regarding production of a new product to be developed, with use of the new product graph and an existing product graph, through a link prediction for predicting relationship between nodes which are not connected together via a link in the new product graph and the existing product graph. The inferring section 405 infers, based on the probability calculated by the link prediction section 403, a method for producing the new product which matches the request.

With the above configuration, the food development assistance apparatus 4 infers, based on a probability that a node indicating a predetermined property is linked to a node contained in a new product graph, a method for producing a new product which matches a request. The probability that a node indicating a predetermined property is linked to a node contained in the new product graph indicates a possibility that the new product has a predetermined property. Response information generated on the basis of this probability is thus useful for the development of the new product. Therefore, with the above configuration, it is possible to contribute the development of a new food product having a desired property.

(Flow of Process)

Figure 16:
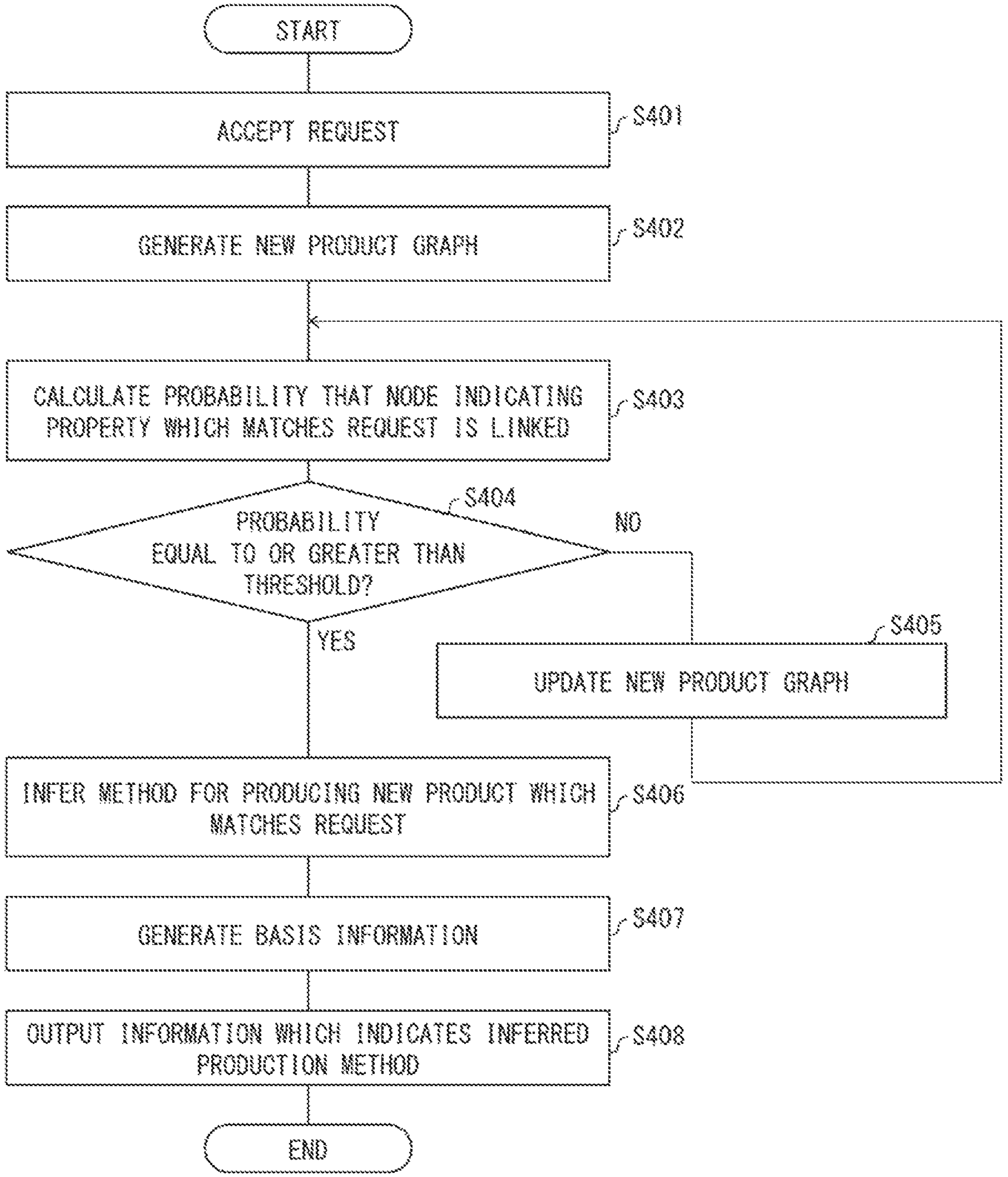
FIG. 16 is a flowchart illustrating a flow of a process carried out by the food development assistance apparatus in accordance with the fifth example embodiment of the present invention.

Next, a flow of a process (food development assistance method) carried out by the food development assistance apparatus 4 will be described below on the basis of FIG. 16. FIG. 16 is a flowchart illustrating a flow of a process carried out by the food development assistance apparatus 4.

In S401, the accepting section 401 accepts a request regarding the development of a new food product. In S401, the request indicating, for example, a property which the new product is required to have and some of the ingredients to be used in producing the new product is accepted.

In S402, the graph generating section 402 generates a new product graph on the basis of the information inputted in S401. For example, in a case of acceptance, in S401, of the input of a property which the new product is required to have and one of the ingredients to be used in producing the new product, the graph generating section 402 may generate the new product graph containing nodes and links which indicate the property and the ingredient.

In S403, the link prediction section 403 calculates a probability that a node indicating the property which matches the request accepted in S401 is linked to a node contained in the new product graph generated in S402. As described above, the calculation of this probability is performed through a link prediction made with use of a learned existing product graph and the new product graph.

In S404, the graph updating section 404 judges whether the probability calculated in S403 is equal to or greater than a threshold. In a case where it has been judged that the probability is equal to or greater than a threshold ("YES" in S404), the process proceeds to S406, and in a case where it has been judged that the probability is smaller than the threshold ("NO" in S404), the process proceeds to S405.

It should be noted that in a case where a plurality of properties has been indicated in the request accepted in S401, the prediction is carried out for each of the properties in S403, and the judgment in S404 may be "YES" in a case where the probabilities for all the properties are equal to or greater than a threshold, and may be "NO" in a case where the probability for any of the properties is smaller than the threshold. This makes it possible to infer a method for producing a new product which has all the required properties.

The request may indicate that the new product does not have a predetermined property. For example, the request may indicate that tan ingredient is not an allergy-causing ingredient. In this case, a probability that a node indicating the property is linked is calculated in S403, and whether the probability is equal to or smaller than the threshold may be judged in S404.

In S405, the graph updating section 404 updates the new product graph. Specifically, the graph updating section 404 may replace a node contained in the current new product graph with another node, or may add a new node and a new link to the current new product graph. As described above, the details of update may be determined according to the input from a user, or may be determined by the graph updating section 404.

When the new product graph is updated, the process is returned to S403, and the probability is calculated again. That is, in the process of FIG. 16, the calculation of the probability in S403 and the update of the new product graph in S405 are repeated until the judgment in S404 becomes "YES".

In S406, the inferring section 405 infers the method for producing the new product which matches the request accepted in S401. Specifically, the inferring section 405 infers that the production method indicated in the new product graph at the time when the judgment in S404 becomes YES is the method for producing the new product graph which matches the request.

In S407, the basis generating section 406 generates basis information which indicates the basis for the inference carried out in S406. Specifically, the basis generating section 406 may generate the basis information which contains information on an existing product having the same property that the new product is required to have, and this basis for producing an existing product having the same property that the new product is required to have.

In S408, the outputting section 210 outputs information indicating the production method inferred in S406. In this outputting, the outputting section 210 may also output the basis information generated in S407. With this, the process illustrated in FIG. 16 ends.

Variation

Figure 17:
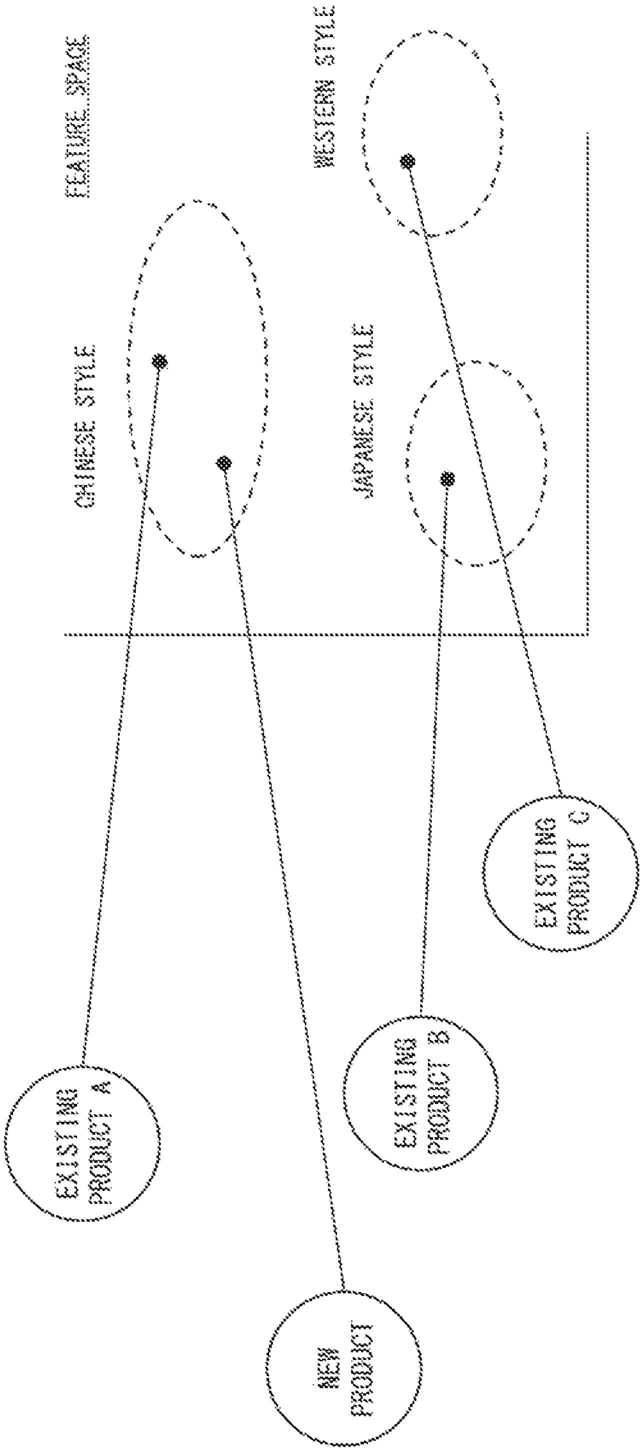
FIG. 17 is an explanatory diagram of an example in which a property of a new product is predicted on the basis of a feature quantity calculated from a new product graph and an existing product graph.

As described above, with use of a new product graph and an existing product graph, it is possible to predict, through a link prediction, a property of a new product indicated in the new product graph. In addition, the prediction of a property of a new product can be carried out by a method other than a link prediction. This will be described with reference to FIG. 17. FIG. 17 is an explanatory diagram of an example in which a property of a new product is predicted on the basis of a feature quantity calculated from a new product graph and an existing product graph. In FIG. 17, existing product graphs of the existing products A to C and a new product graph of a new product are illustrated. The illustration of nodes and links contained in these graphs are omitted.

It is possible to calculate the feature quantity of each of the existing products, by adding together the feature quantities of the respective nodes contained in an existing product graph after multiplying each of the feature quantities by a weight according to a link connected to the corresponding node. Therefore, by conducting learning which is to update the weight such that a calculated feature quantity becomes in accordance with the property of the existing product, it is possible to predict a property of the new product on the basis of the feature quantity of a new product graph which is calculated with the weights being applied.

For example, in the example of FIG. 17, learning is conducted such that a feature quantity calculated from the existing product graph of the existing product A, which has been found to be of a Chinese style product, falls within a range corresponding to the property "Chinese style" in a feature space. Further, learning is conducted such that a feature quantity calculated from the existing product graph of the existing product B, which has been found to be of a Japanese style, falls within a range corresponding to the property "Japanese style" in the feature space.

In this case, if a feature quantity calculated from the new product graph falls within the range corresponding to the property "Japanese style", then the new product can be predicted to have the property "Japanese style". Such a method for predicting a property can be used as a technique alternative to the property prediction methods in accordance with the respective example embodiments described above.

[Software Implementation Example]

Some or all of the functions of the food development assistance apparatuses 1, 2, 3, and 4 (hereinafter, "food development assistance apparatus 1 and the like") may be implemented by hardware such as an integrated circuit (IC chip), or may be implemented by software.

Figure 18:
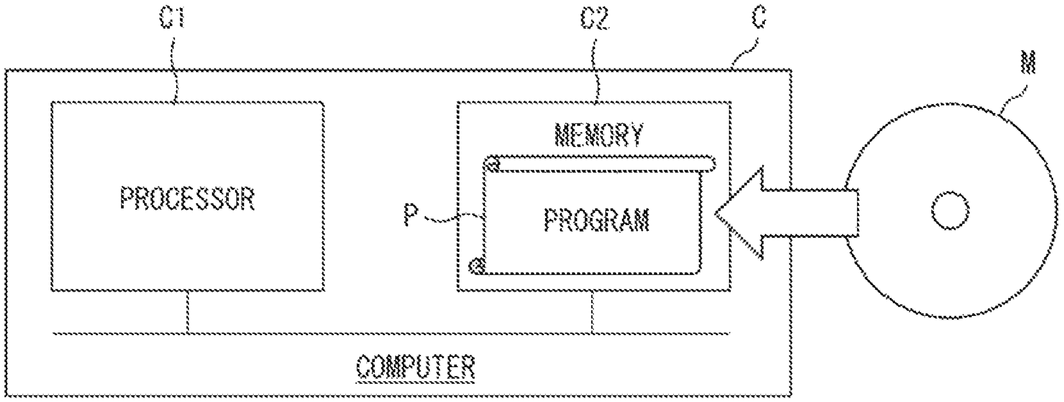
FIG. 18 is a diagram of a configuration for providing a food development assistance apparatus by software.

In the latter case, the food development assistance apparatus 1 and the like are provided by, for example, a computer that executes instructions of a program that is software implementing the foregoing functions. An example (hereinafter, computer C) of such a computer is illustrated in FIG. 18. The computer C includes at least one processor C1 and at least one memory C2. The memory C2 has recorded thereon a program P for causing the computer C to operate as the food development assistance apparatus 1 and the like. The processor C1 of the computer C retrieves the program P from the memory C2 and executes the program P, so that the functions of the food development assistance apparatus 1 and the like are implemented.

Examples of the at least one processor C1 can include a central processing unit (CPU), a graphics processing unit (GPU), a digital signal processor (DSP), a micro processing unit (MPU), a floating point number processing unit (FPU), a physics processing unit (PPU), a microcontroller, and a combination thereof. Examples of the memory C2 can include a flash memory, a hard disk drive (HDD), a solid state drive (SSD), and a combination thereof.

The computer C may further include a random access memory (RAM) into which the program P is loaded at the time of execution and in which various kinds of data are temporarily stored. The computer C may further include a communication interface via which data is transmitted to and received from another apparatus. The computer C may further include an input-output interface via which input-output equipment such as a keyboard, a mouse, a display or a printer is connected.

The program P can be recorded on a non-transitory, tangible recording medium M capable of being read by the computer C. Examples of such a recording medium M can include a tape, a disk, a card, a semiconductor memory, and a programmable logic circuit. The computer C can obtain the program P via such a recording medium M. Alternatively, the program P can be transmitted through a transmission medium. Examples of such a transmission medium can include a communication network and a broadcast wave. The computer C can obtain the program P also via such a transmission medium.

Additional Remark 1

The present invention is not limited to the foregoing example embodiments, but may be altered in various ways by a skilled person within the scope of the claims. For example, the present invention also encompasses, in its technical scope, any example embodiment derived by appropriately combining technical means disclosed in the above example embodiments.

Additional Remark 2

The whole or part of the example embodiments disclosed above can be described as, but not limited to, the following supplementary notes.

Supplementary Note 1

A food development assistance apparatus including: an accepting means for accepting a request regarding development of a new food product; an inferring means for inferring, based on the request and a learned model which has learned a relation between a method for producing an existing product which is an existing food product and at least one selected from the group consisting of an ingredient used in the existing product, a commodity category of the existing product, a development concept of the existing product, and a property of the existing product, a method for producing a new product which matches the request; and an outputting means for outputting information which indicates the method for producing the new product inferred by the inferring means.

With the above configuration, it is possible to suitably assist the development of a new food product.

Supplementary Note 2

The food development assistance apparatus described in supplementary note 1, characterized in that the request contains information which indicates a development concept of the new product or information which indicates an ingredient to be used in the new product, the food development assistance apparatus further includes a basis generating means for generating basis information which contains, as basis for the inferring, information on an existing product a development concept of which is the same as the development concept of the new product or information on an existing product in which an ingredient the same as the ingredient to be used in the new product is used, and the outputting means is configured to further output the basis information.

With the above configuration, as the basis for the production method to be presented (such as a recipe), an existing commodity the development concept of which is the same or in which the same ingredient is used is presented as the basis. This makes it possible for a developer (a user) to easily understand the details of a new product and the method for making the new product.

Supplementary Note 3

The food development assistance apparatus described in supplementary note 2, in which the basis information contains information which indicates a method for producing an existing product a development concept of which is the same as the development concept of the new product or an existing product in which an ingredient the same as the ingredient to be used in the new product is used.

With the above configuration, it is possible for a developer to judge, from the developer's experience, whether the outputted method for producing the new product matches the requested product.

Supplementary Note 4

The food development assistance apparatus described in supplementary note 1, in which the learned model is an existing product graph in which one or more existing products each of which is the existing product are represented with use of nodes and edges, the nodes each representing a development concept, a property, or a production method of a corresponding existing product of the one or more existing products, or an ingredient used in the corresponding existing product, the edges each representing relationship between corresponding ones of the nodes.

The above existing product graph is a graph in which an existing product is represented with use of nodes and edges, the nodes each representing a development concept, a property, or a production method of an existing product, or an ingredient used in a corresponding existing product of the plurality of existing products, the edges each representing relationship between corresponding nodes of the nodes. Therefore, with the above configuration, it is possible to infer a proper production method in consideration of mutual relationship between the plurality of existing products in terms of the development concept of the existing product, the property of the existing product, the method for producing the existing product or the ingredients used in the existing products.

Supplementary Note 5

The food development assistance apparatus described in supplementary note 4, further including a link prediction means for predicting a node to be linked to a node contained in a new product graph containing a plurality of nodes regarding production of a new product to be developed, from among nodes which are contained in the existing product graph and each of which indicates an ingredient, a flavoring, or a cooking procedure used in the corresponding existing product, with use of the new product graph and the existing product graph, through a link prediction for predicting relationship between nodes which are not connected together via a link in the new product graph and the existing product graph, the inferring means being configured to infer, based on the node predicted by the link prediction means, the method for producing the new product which matches the request.

With the above configuration, a node to be linked to a node contained in a new product graph is predicted from among nodes each indicating an ingredient, a flavoring, or a cooking procedure used in an existing product. A node to be linked to a node contained in a new product graph is information useful for inferring a method for producing the new product which matches a request. With the above configuration, it is possible to infer a method for producing the new product which matches the request, in consideration of this useful information.

Supplementary Note 6

The food development assistance apparatus described in supplementary note 5, in which the link prediction means is configured to predict a node which indicates an ingredient, a flavoring, or a cooking procedure used in an existing product of the existing product graph and which is to be linked to a node contained in the new product graph, from among nodes which are contained in the existing product graph which contains a node that matches the development concept of the new product.

With the above configuration, a prediction range of the node to be linked to a node contained in the new product graph is narrowed to the existing product graph which contains the node which matches the development concept of the new product. This makes it possible to predict a node which is highly likely to contribute to the development concept of the new product.

Supplementary Note 7

The food development assistance apparatus described in supplementary note 5, further including an evaluating means for evaluating the node predicted by the link prediction means, the evaluating means being configured to more highly evaluate the node predicted by the link prediction means in a case where a node indicating a property which the new product is required to have is contained in the existing product graph containing the node predicted by the link prediction means than in a case where the node indicating the property which the new product is required to have is not contained in the existing product graph containing the node predicted by the link prediction means.

A second node contained in an existing product graph which contains a first node indicating a certain property is likely to be a factor in imparting that property to the existing product. For example, in a case where an existing product graph which contains a node indicating "having gained popularity among young people" contains a node "tapioca" indicating an ingredient of the existing product, the node "tapioca" is likely to be a factor in "gaining popularity among young people".

Therefore, with the above configuration, among the nodes predicted by the link prediction means, a node of an existing product graph that contains a node indicating a property the new product is required to have is more highly evaluated than a node of an existing product graph that does not contain the node indicating the property the new product is required to have. In accordance with this evaluation, a user may determine whether to apply, to the new product, an ingredient, a flavoring, or a cooking procedure indicated by the predicted node. This makes it possible to contribute to the development of a new product having a desired property.

Supplementary Note 8

The food development assistance apparatus described in supplementary note 1 or 2, further including a link prediction means for identifying the existing product having predetermined relationship with the new product, with use of a new product graph which contains a plurality of nodes regarding production of a new product to be developed and the plurality of existing product graphs each generated for a corresponding one of a plurality of existing products, through a link prediction for predicting relationship between nodes which are not connected together via a link in the new product graph and the plurality of existing product graphs, the inferring means being configured to infer, based on the existing product identified by the link prediction means, the method for producing the new product which matches the request.

With the above configuration, an existing product having predetermined relationship with a new product is identified, and a method for producing a new product which matches the request is inferred based on the identified existing product. Information on an existing product having predetermined relationship with a new product to be developed is useful for the development of the new product. Thus, with the above configuration, it is possible to suitably assist the development of a new food product.

Supplementary Note 9

The food development assistance apparatus described in supplementary note 1 or 2, further including a link prediction means for identifying the existing product having predetermined relationship with a base product on which a new product to be developed is to be based, with use of a base product graph which contains a plurality of nodes regarding production of the base product and a plurality of existing product graphs each generated for a corresponding one of a plurality of existing products, through a link prediction for predicting relationship between nodes which are not connected together via a link in the base product graph and the plurality of existing product graphs, the inferring means being configured to infer, based on the existing product identified by the link prediction means, the method for producing the new product which matches the request.

With the above configuration, an existing product having predetermined relationship with a base product is identified, and a method for producing a new product which matches the request is inferred based on the identified existing product. Information on an existing product having predetermined relationship with a base product on which a new product is to be based is useful for the development of the new product. Thus, with the above configuration, it is possible to contribute to the development of a new food product carried out with use of a base product.

Supplementary Note 10

The food development assistance apparatus according to supplementary note 1 or 2, further including a link prediction means for calculating a probability that a node indicating a predetermined property is linked to a node contained in a new product graph which contains a plurality of nodes regarding production of a new product to be developed, with use of the new product graph and a plurality of existing product graphs each generated for a corresponding one of a plurality of existing products, through a link prediction for predicting relationship between nodes which are not connected together via a link in the new product graph and the plurality of existing product graphs, the inferring means being configured to infer, based on the probability calculated by the link prediction means, the method for producing the new product which matches the request.

With the above configuration, a method for producing a new product which matches a request is inferred based on a probability that a node indicating a predetermined property is linked to a node contained in a new product graph. The probability that a node indicating a predetermined property is linked to a node contained in the new product graph indicates a possibility that the new product has a predetermined property. Response information generated on the basis of this probability is thus useful for the development of the new product. Therefore, with the above configuration, it is possible to contribute the development of a new food product having a desired property.

Supplementary Note 11

A food development assistance method carried out with use of a computer, the computer being configured to carry out: accepting a request regarding development of a new food product; inferring, based on the request and a learned model which has learned a relation between a method for producing an existing product which is an existing food product and at least one selected from the group consisting of an ingredient used in the existing product, a commodity category of the existing product, a development concept of the existing product, and a property of the existing product, a method for producing a new product which matches the request; and outputting information which indicates the method for producing the new product inferred.

With the above configuration, it is possible to suitably assist the development of a new food product.

Supplementary Note 12

A food development assistance program for causing a computer to carry out: a process of accepting a request regarding development of a new food product; a process of inferring, based on the request and a learned model which has learned a relation between a method for producing an existing product which is an existing food product and at least one selected from the group consisting of an ingredient used in the existing product, a commodity category of the existing product, a development concept of the existing product, and a property of the existing product, a method for producing a new product which matches the request; and a process of outputting information which indicates the method for producing the new product inferred.

Additional Remark 3

The whole or part of the example embodiments disclosed above can be further described as the following supplementary notes.

A food development assistance apparatus including at least one processor, the at least one processor carrying output: an accepting process of accepting a request regarding development of a new food product; an inferring process of inferring, based on the request and a learned model which has learned a relation between a method for producing an existing product which is an existing food product and at least one selected from the group consisting of an ingredient used in the existing product, a commodity category of the existing product, a development concept of the existing product, and a property of the existing product, a method for producing a new product which matches the request; and an outputting process of outputting information which indicates the method for producing the new product inferred.

This food development assistance apparatus may further include a memory. This memory may have recorded thereon a program for causing the at least one processor to carry out the accepting process, the inferring process, and the outputting process. In addition, this program may be recorded on a computer-readable, non-transitory, and tangible recording medium.

REFERENCE SIGNS LIST

1, 2, 3, 4: Food development assistance apparatus
11: Accepting section
12: Inferring section
13: Outputting section
201, 301, 401: Accepting section
202, 302, 402: Graph generating section
203, 403: Link prediction section
204: Evaluating section
205, 404: Graph updating section
206: Learning section
207, 305, 405: Inferring section
208, 306, 406: Basis generating section
210, 307: Outputting section
304: Property predicting section
407: Feature quantity deriving section

What is claimed is:

1. A food development assistance apparatus comprising at least one processor, the at least one processor carrying out:

an accepting process of accepting a request regarding development of a new food product;

an inferring process of inferring, based on the request and a learned model which has learned a relation between a method for producing an existing product which is an existing food product and at least one selected from the group consisting of an ingredient used in the existing product, a commodity category of the existing product, a development concept of the existing product, and a property of the existing product, a method for producing a new product which matches the request; and an outputting process of outputting information which indicates the method for producing the new product inferred in the inferring process, wherein the request contains information which indicates a development concept of the new product or information which indicates an ingredient to be used in the new product, the at least one processor further carries out a basis generating process of generating basis information which contains, as basis for the inferring, information on an existing product a development concept of which is the same as the development concept of the new product or information on an existing product in which an ingredient the same as the ingredient to be used in the new product is used, in the outputting process, the at least one processor further outputs the basis information, and the basis information contains information which indicates a method for producing an existing product a development concept of which is the same as the development concept of the new product or an existing product in which an ingredient the same as the ingredient to be used in the new product is used.

2. The food development assistance apparatus according to claim 1, wherein the learned model is an existing product graph in which one or more existing products each of which is the existing product are represented with use of nodes and edges, the nodes each representing a development concept, a property, or a production method of a corresponding existing product of the one or more existing products, or an ingredient used in the corresponding existing product, the edges each representing relationship between corresponding ones of the nodes.

3. The food development assistance apparatus according to claim 2, wherein the at least one processor further carries out a link prediction process of predicting a node to be linked to a node contained in a new product graph containing a plurality of nodes regarding production of a new product to be developed, from among nodes which are contained in the existing product graph and each of which indicates an ingredient, a flavoring, or a cooking procedure used in the corresponding existing product, with use of the new product graph and the existing product graph, through a link prediction for predicting relationship between nodes which are not connected together via a link in the new product graph and the existing product graph, in the inferring process, the at least one processor infers, based on the node predicted-in the link prediction process, the method for producing the new product which matches the request.

4. The food development assistance apparatus according to claim 3, wherein in the link prediction process, the at least one processor predicts a node which indicates an ingredient, a flavoring, or a cooking procedure used in an existing product of the existing product graph and which is to be linked to a node contained in the new product graph, from among nodes which are contained in the existing product graph which contains a node that matches the development concept of the new product.

5. The food development assistance apparatus according to claim 3, wherein the at least one processor further carries out an evaluating process of evaluating the node predicted in the link prediction process, in the evaluating process, the at least one processor more highly evaluates the node predicted in the link prediction process in a case where a node indicating a property which the new product is required to have is contained in the existing product graph containing the node predicted in the link prediction process than in a case where the node indicating the property which the new product is required to have is not contained in the existing product graph containing the node predicted in the link prediction process.

6. The food development assistance apparatus according to claim 1, wherein the at least one processor further carries out a link prediction process for identifying the existing product having predetermined relationship with the new product, with use of a new product graph which contains a plurality of nodes regarding production of a new product to be developed and a plurality of existing product graphs each generated for a corresponding one of a plurality of existing products, through a link prediction for predicting relationship between nodes which are not connected together via a link in the new product graph and the plurality of existing product graphs, in the inferring process, the at least one processor infers, based on the existing product identified by the link prediction means, the method for producing the new product which matches the request.

7. The food development assistance apparatus according to claim 1, wherein the at least one processor further carries out a link prediction process for identifying the existing product having predetermined relationship with a base product on which a new product to be developed is to be based, with use of a base product graph which contains a plurality of nodes regarding production of the base product and a plurality of existing product graphs each generated for a corresponding one of a plurality of existing products, through a link prediction for predicting relationship between nodes which are not connected together via a link in the base product graph and the plurality of existing product graphs, in the inferring process, the at least one processor infers, based on the existing product identified in the link prediction process, the method for producing the new product which matches the request.

8. The food development assistance apparatus according to claim 1, wherein the at least one processor further carries out a link prediction process for calculating a probability that a node indicating a predetermined property is linked to a node contained in a new product graph which contains a plurality of nodes regarding production of a new product to be developed, with use of the new product graph and a plurality of existing product graphs each generated for a corresponding one of a plurality of existing products, through a link prediction for predicting relationship between nodes which are not connected together via a link in the new product graph and the plurality of existing product graphs, in the inferring process, the at least one processor infers, based on the probability calculated in the link prediction process, the method for producing the new product which matches the request.

9. A food development assistance method carried out with use of a computer, the computer being configured to carry out:

accepting a request regarding development of a new food product;

inferring, based on the request and a learned model which has learned a relation between a method for producing an existing product which is an existing food product and at least one selected from the group consisting of an ingredient used in the existing product, a commodity category of the existing product, a development concept of the existing product, and a property of the existing product, a method for producing a new product which matches the request; and outputting information which indicates the method for producing the new product inferred, wherein the request contains information which indicates a development concept of the new product or information which indicates an ingredient to be used in the new product, the computer further carries out a basis generating process of generating basis information which contains, as basis for the inferring, information on an existing product a development concept of which is the same as the development concept of the new product or information on an existing product in which an ingredient the same as the ingredient to be used in the new product is used, in the outputting process, the computer further outputs the basis information, and the basis information contains information which indicates a method for producing an existing product a development concept of which is the same as the development concept of the new product or an existing product in which an ingredient the same as the ingredient to be used in the new product is used.

10. The food development assistance method according to claim 9, wherein the learned model is an existing product graph in which one or more existing products each of which is the existing product are represented with use of nodes and edges, the nodes each representing a development concept, a property, or a production method of a corresponding existing product of the one or more existing products, or an ingredient used in the corresponding existing product, the edges each representing relationship between corresponding ones of the nodes.

11. The food development assistance method according to claim 10, wherein the computer further carries out a link prediction process of predicting a node to be linked to a node contained in a new product graph containing a plurality of nodes regarding production of a new product to be developed, from among nodes which are contained in the existing product graph and each of which indicates an ingredient, a flavoring, or a cooking procedure used in the corresponding existing product, with use of the new product graph and the existing product graph, through a link prediction for predicting relationship between nodes which are not connected together via a link in the new product graph and the existing product graph, in the inferring process, the computer infers, based on the node predicted-in the link prediction process, the method for producing the new product which matches the request.

12. The food development assistance method according to claim 11, wherein in the link prediction process, the computer predicts a node which indicates an ingredient, a flavoring, or a cooking procedure used in an existing product of the existing product graph and which is to be linked to a node contained in the new product graph, from among nodes which are contained in the existing product graph which contains a node that matches the development concept of the new product.

13. The food development assistance method according to claim 11, wherein the computer further carries out an evaluating process of evaluating the node predicted in the link prediction process, in the evaluating process, the computer more highly evaluates the node predicted in the link prediction process in a case where a node indicating a property which the new product is required to have is contained in the existing product graph containing the node predicted in the link prediction process than in a case where the node indicating the property which the new product is required to have is not contained in the existing product graph containing the node predicted in the link prediction process.

14. The food development assistance method according to claim 9, wherein the computer further carries out a link prediction process for identifying the existing product having predetermined relationship with the new product, with use of a new product graph which contains a plurality of nodes regarding production of a new product to be developed and a plurality of existing product graphs each generated for a corresponding one of a plurality of existing products, through a link prediction for predicting relationship between nodes which are not connected together via a link in the new product graph and the plurality of existing product graphs, in the inferring process, the computer infers, based on the existing product identified by the link prediction means, the method for producing the new product which matches the request.

15. A computer-readable non-transitory recording medium having recorded thereon a food development assistance program for causing a computer to carry out:

a process of accepting a request regarding development of a new food product;

a process of inferring, based on the request and a learned model which has learned a relation between a method for producing an existing product which is an existing food product and at least one selected from the group consisting of an ingredient used in the existing product, a commodity category of the existing product, a development concept of the existing product, and a property of the existing product, a method for producing a new product which matches the request; and a process of outputting information which indicates the method for producing the new product inferred, wherein the request contains information which indicates a development concept of the new product or information which indicates an ingredient to be used in the new product, the food development assistance program causes the computer to further carry out a basis generating process of generating basis information which contains, as basis for the inferring, information on an existing product a development concept of which is the same as the development concept of the new product or information on an existing product in which an ingredient the same as the ingredient to be used in the new product is used, in the outputting process, the computer further carries out a process of outputting the basis information, and the basis information contains information which indicates a method for producing an existing product a development concept of which is the same as the development concept of the new product or an existing product in which an ingredient the same as the ingredient to be used in the new product is used.

16. The computer-readable non-transitory recording medium according to claim 15, wherein the learned model is an existing product graph in which one or more existing products each of which is the existing product are represented with use of nodes and edges, the nodes each representing a development concept, a property, or a production method of a corresponding existing product of the one or more existing products, or an ingredient used in the corresponding existing product, the edges each representing relationship between corresponding ones of the nodes.

17. The computer-readable non-transitory recording medium according to claim 16, wherein the computer further carries out a link prediction process of predicting a node to be linked to a node contained in a new product graph containing a plurality of nodes regarding production of a new product to be developed, from among nodes which are contained in the existing product graph and each of which indicates an ingredient, a flavoring, or a cooking procedure used in the corresponding existing product, with use of the new product graph and the existing product graph, through a link prediction for predicting relationship between nodes which are not connected together via a link in the new product graph and the existing product graph, in the inferring process, the computer infers, based on the node predicted-in the link prediction process, the method for producing the new product which matches the request.

18. The computer-readable non-transitory recording medium according to claim 17, wherein in the link prediction process, the computer predicts a node which indicates an ingredient, a flavoring, or a cooking procedure used in an existing product of the existing product graph and which is to be linked to a node contained in the new product graph, from among nodes which are contained in the existing product graph which contains a node that matches the development concept of the new product.

19. The computer-readable non-transitory recording medium according to claim 17, wherein the computer further carries out an evaluating process of evaluating the node predicted in the link prediction process, in the evaluating process, the computer more highly evaluates the node predicted in the link prediction process in a case where a node indicating a property which the new product is required to have is contained in the existing product graph containing the node predicted in the link prediction process than in a case where the node indicating the property which the new product is required to have is not contained in the existing product graph containing the node predicted in the link prediction process.

20. The computer-readable non-transitory recording medium according to claim 15, wherein the computer further carries out a link prediction process for identifying the existing product having predetermined relationship with the new product, with use of a new product graph which contains a plurality of nodes regarding production of a new product to be developed and a plurality of existing product graphs each generated for a corresponding one of a plurality of existing products, through a link prediction for predicting relationship between nodes which are not connected together via a link in the new product graph and the plurality of existing product graphs, in the inferring process, the computer infers, based on the existing product identified by the link prediction means, the method for producing the new product which matches the request.

* * * * *